(12) United States Patent
Shearin et al.

(10) Patent No.: US 9,004,359 B2
(45) Date of Patent: Apr. 14, 2015

(54) OPTICAL SCANNER WITH TOP DOWN READER

(71) Applicant: Datalogic ADC, Inc., Eugene, OR (US)

(72) Inventors: Alan Shearin, Eugene, OR (US); Ryan B. Thompson, Eugene, OR (US); Jeffrey J. Hoskinson, Eugene, OR (US); Jon P. C. Williams, Eugene, OR (US); David J. Newman, Eugene, OR (US); Alexander M. McQueen, Eugene, OR (US); Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/895,258

(22) Filed: May 15, 2013

(65) Prior Publication Data

US 2013/0306727 A1    Nov. 21, 2013

Related U.S. Application Data

(60) Provisional application No. 61/647,937, filed on May 16, 2012, provisional application No. 61/657,634, filed on Jun. 8, 2012.

(51) Int. Cl.
G06K 7/00 (2006.01)
G06K 7/10 (2006.01)
G06K 7/14 (2006.01)

(52) U.S. Cl.
CPC .............. *G06K 7/1096* (2013.01); *G06K 7/10* (2013.01)

(58) Field of Classification Search
CPC .............................. G06K 7/1096; G06K 7/10
USPC ............... 235/440, 439, 435, 454, 462.01, 235/462.13, 462.14, 462.17, 462.35, 235/462.41, 462.42, 462.43
See application file for complete search history.

(56) References Cited

U.S. PATENT DOCUMENTS

| 4,369,361 | A | * | 1/1983 | Swartz et al. ................ 235/470 |
| 4,565,430 | A | | 1/1986 | Grunwald |
| 4,939,355 | A | | 7/1990 | Rando et al. |
| 5,019,694 | A | | 5/1991 | Collins, Jr. |
| 5,019,714 | A | | 5/1991 | Knowles |
| 5,042,619 | A | | 8/1991 | Kohno |

(Continued)

FOREIGN PATENT DOCUMENTS

| JP | 08-286134 | 11/1996 |
| WO | WO-90/01715 | 2/1990 |

OTHER PUBLICATIONS

Korean Intellectual Property Office, International Search Report and Written Opinion, International Patent Application No. PCT/US2013/041445, dated Aug. 23, 2013, 17 pages.

*Primary Examiner* — Thien M Le
*Assistant Examiner* — Claude J Brown
(74) *Attorney, Agent, or Firm* — Stoel Rives LLP

(57) ABSTRACT

A data reading system including one or more imagers, the data reading system having a lower main housing structure with a horizontal surface, across which items to be read are passed, and an upper reader module, such as pole-mounted top down reader (TDR) including an imager configured to provide a top down viewing angle from above the horizontal surface of the item in a read region. In one configuration, the pole-mounted upper reader module includes a one-piece post housing section mounted to the main housing structure and extending therefrom and containing imaging electronics and optics of the upper reader.

23 Claims, 22 Drawing Sheets

(56) References Cited

U.S. PATENT DOCUMENTS

| | | | |
|---|---|---|---|
| 5,140,141 A * | 8/1992 | Inagaki et al. | 235/462.43 |
| 5,229,588 A * | 7/1993 | Detwiler et al. | 235/462.35 |
| 5,266,788 A | 11/1993 | Yamazaki et al. | |
| 5,430,283 A * | 7/1995 | Tanaka | 235/462.2 |
| RE35,117 E | 12/1995 | Rando et al. | |
| 5,543,607 A * | 8/1996 | Watanabe et al. | 235/383 |
| 5,815,300 A * | 9/1998 | Ohkawa et al. | 359/196.1 |
| 6,189,784 B1 | 2/2001 | Williams et al. | |
| 6,330,973 B1 * | 12/2001 | Bridgelall et al. | 235/462.45 |
| 6,446,870 B1 | 9/2002 | Rando | |
| 6,460,768 B2 | 10/2002 | Ring et al. | |
| 6,843,416 B2 | 1/2005 | Swartz et al. | |
| D509,507 S | 9/2005 | Myles et al. | |
| 6,982,388 B2 | 1/2006 | Kasinoff | |
| 7,416,118 B2 | 8/2008 | Throckmorton et al. | |
| 7,533,819 B2 | 5/2009 | Barkan et al. | |
| 7,845,563 B2 | 12/2010 | Kotlarsky et al. | |
| 7,848,948 B2 | 12/2010 | Perkowski et al. | |
| D631,478 S | 1/2011 | McQueen et al. | |
| 7,900,839 B2 | 3/2011 | Kotlarsky et al. | |
| D642,178 S | 7/2011 | McQueen | |
| 8,079,526 B2 | 12/2011 | Barkan et al. | |
| 8,322,614 B2 * | 12/2012 | Fergen et al. | 235/385 |
| 8,537,005 B2 * | 9/2013 | Barkan et al. | 340/540 |
| 2004/0065740 A1 * | 4/2004 | Mergenthaler et al. | 235/462.14 |
| 2009/0107773 A1 * | 4/2009 | Notheis et al. | 186/68 |
| 2010/0001075 A1 * | 1/2010 | Barkan | 235/462.41 |
| 2010/0158310 A1 | 6/2010 | McQueen et al. | |
| 2010/0163626 A1 | 7/2010 | Olmstead | |
| 2010/0163627 A1 | 7/2010 | Olmstead | |
| 2010/0257063 A1 | 10/2010 | Clifford et al. | |
| 2011/0168780 A1 | 7/2011 | McQueen et al. | |
| 2011/0276422 A1 * | 11/2011 | Fergen et al. | 705/23 |
| 2011/0290889 A1 | 12/2011 | Tamburrini et al. | |
| 2011/0309147 A1 * | 12/2011 | Barkan et al. | 235/440 |
| 2013/0075472 A1 * | 3/2013 | Collins et al. | 235/440 |

\* cited by examiner

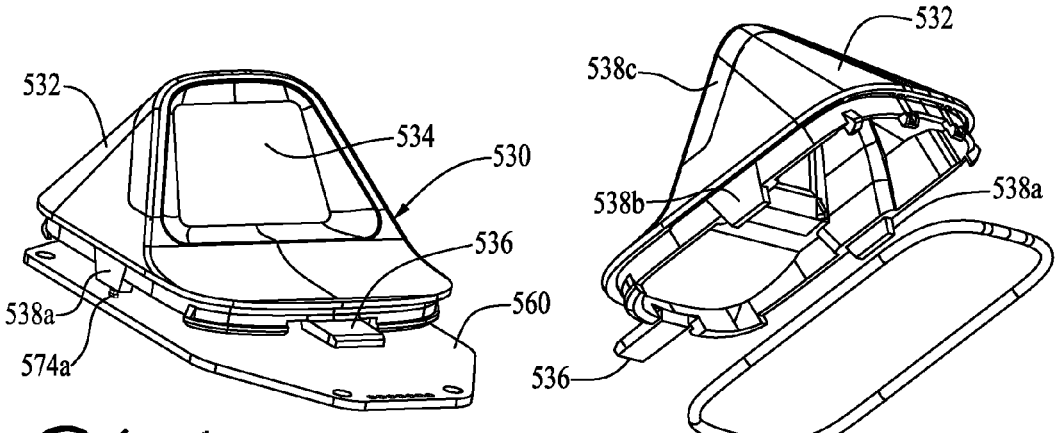
fig.16      fig.17
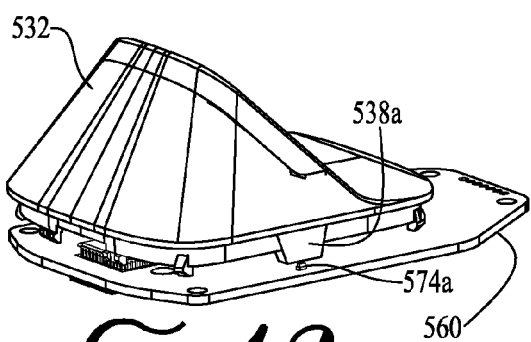 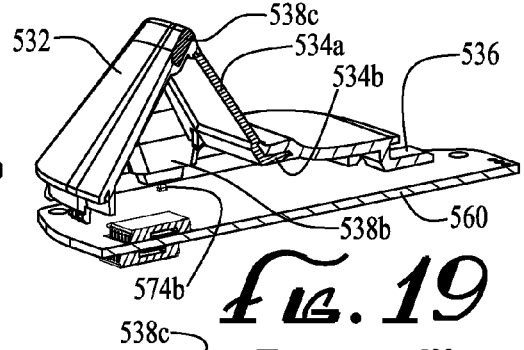
fig.18      fig.19
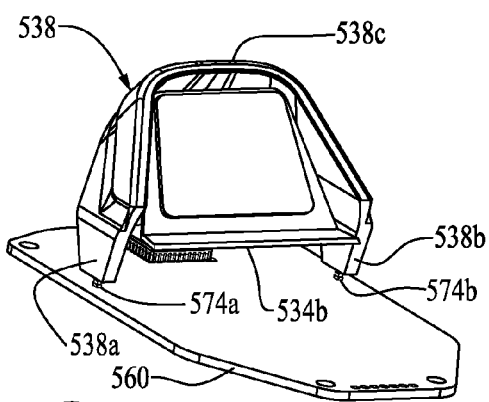 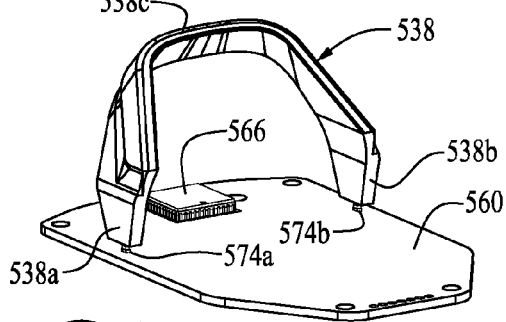
fig.20      fig.21
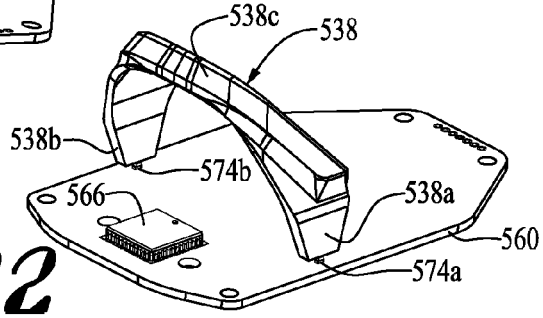
fig.22

OPTICAL SCANNER WITH TOP DOWN READER

RELATED APPLICATION DATA

This application claims priority under 35 U.S.C. §119(e) to U.S. Provisional Application No. 61/647,937 filed on May 16, 2012 and to U.S. Provisional Application No. 61/657,634 filed on Jun. 8, 2012, both of these applications hereby incorporated by reference.

BACKGROUND

The field of this disclosure relates generally to systems and methods for data reading and/or image capture, and more particularly, to systems incorporating a configuration with improved capability for reading optical codes on a top surface or upwardly-angled surfaces of an item.

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes.

Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items. Though some imaging readers are capable of using ambient light illumination, an imaging reader typically utilizes a light source to illuminate the item being read to provide the required signal response in the imaging device. An imager-based reader utilizes a camera or imager to generate electronic image data. The image data, typically in digital form, is then processed to find and decode the optical code.

Many high performance optical code reading devices require large and vertically tall housing structures to allow for effective reading of the top surfaces of passing items. Although recent developments of more compact imaging-based readers has allowed for some size reduction of these typically large housing structures, such reading devices still rely on enclosures extending above the horizontal scanning surface to provide adequate coverage for optical codes on the top surfaces of items.

The present inventors have, therefore, determined that it would be desirable to provide a scanner or reading system that provides an improved reading angle for capturing optical codes on a top surface of a passing item.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

FIG. 16 is a rear left isometric view of the back enclosure of the top down reader from FIG. 10 on an enlarged scale.

FIG. 17 is a bottom front side isometric view of the back enclosure of the top down reader of FIG. 11 on an enlarged scale.

FIG. 18 is a top left front isometric view of the back enclosure of FIGS. 16-17.

FIG. 19 is a partial cross-sectional view of the back enclosure of FIGS. 16-18.

FIG. 20 is a top rear isometric view of the back enclosure of FIGS. 16-19 with the frame removed showing the window and light pipe portions.

FIG. 21 is a top rear isometric view of the back enclosure of FIG. 20 with the frame and window removed showing the light pipe portion.

FIG. 22 is a top front isometric view of the back enclosure of FIGS. 16-19 with the frame and window removed showing the light pipe portion.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various imager-based data readers and associated methods are described herein. Some embodiments of these data readers and systems may provide for improved/enhanced reading performance by providing multiple image fields to capture multiple views. In the following description of the figures and any example embodiments, it should be understood that any image fields or fields of view related to any imager may be partitioned into two or more regions, each of which may be used to capture a separate view/perspective of the view volume. In addition to providing more views than imagers, such embodiments may enhance the effective view volume beyond the view volume available to a single imager having a single field of view.

In the following description of the figures and any example embodiments, it should be understood that use of the data reader having the described features in a retail establishment is merely one use for such a system and should not be considered as limiting. Other uses for data readers with the characteristics and features described herein may be possible, for example, in an industrial location such as a parcel distribution (e.g., postal) station.

Figure 1:
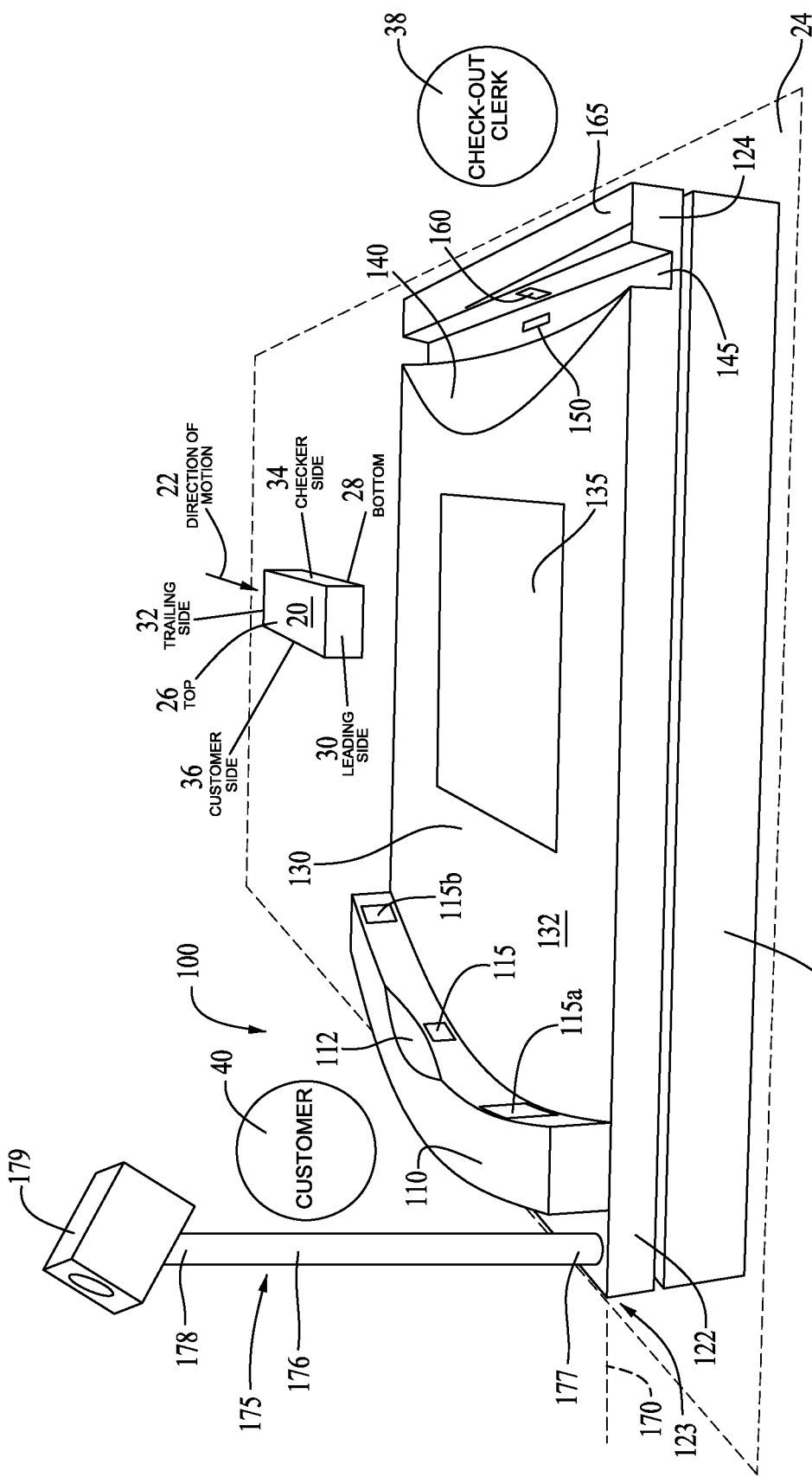
FIG. 1 is a perspective view of a data reader illustrating an exemplary six-sided box-shaped object that may be passed through a view volume of the data reader, according to a first embodiment.

FIG. 1 illustrates a data reader 100 and an exemplary item/object 20 that may be passed through a view volume of the data reader 100. The view volume may be a function of the enclosure and style of the data reader 100 and the perspectives of the views in which images of the object 20 are captured. A perspective may encompass a location, direction, angle, or any combination of the foregoing, or the like, that characterizes a vantage or point of view for seeing, imaging, visualizing via machine vision, or illuminating a part or whole of the object 20.

For general purposes of description, the object 20 is represented as a rectangular six-sided polyhedron, such as a cereal box (hereinafter referred to as a box-shaped item, package or object) having a top side 26, a bottom side 28, a leading side 30, a trailing side 32, a checker side 34, and a customer side 36. In some instances, the object 20 may be described with respect to its direction of motion 22 across a generally horizontal surface 132 of a cover or platter 130, thus the following descriptions regarding the position of the checker 38 and the customer 40 are provided to facilitate description and establish a frame of reference related to typical/example positions of the customer 40 and an operator (e.g., a checkout clerk 38), as illustrated in FIG. 1, and are not intended to be limiting. The box-shaped item is illustrated as being passed through a read region across the surface of the platter 130 and above the window 135 and to the sides of windows 115a, 115b. The illustrated example shows the direction of motion 22 of the object 20 being in a right-to-left scheme (from the vantage of the checker 38), but other directions such as left-to-right are applicable. It should be understood that the data reader 100 may be used without a checkout clerk 38, and/or the customer 40 (or clerk 38) may be positioned at any side of the data reader 100. In addition, the object 20 is described as a box-shaped package for convenience, but it should be understood that the object 20 may encompass other shapes, including, for example, round cans or irregularly shaped packages, such as a bag of oranges, potato chips, or the like.

FIGS. 1-4 illustrate the data reader 100 according to a first embodiment having a frame, which may include a lower housing section 105 and an upper cover or platter section 130. In some embodiments, a portion or all of the cover or platter section 130 may be a weigh platter operable for weighing the object 20. The data reader 100 is typically installed into a countertop or work surface of the checkout stand 24 up to the level of the horizontal surface 132 of the platter 130 indicated by dashed line 170. The checkout clerk 38 typically stands or sits adjacent to a checker end 124, and away from opposing customer end 122, and moves objects 20 across the horizontal surface 132 in the direction of motion 22. Read modules or imagers view objects 20 being moved past the view volumes of the scan windows 115, 135, 160, and 180. Because the end 122 of the data reader 100 is on the side away from the checkout clerk 38, it is possible to provide a small, vertically-protruding section 110, which may house or contain a read module or imager with a view (or multiple views) through window 115. Additional imagers may be provided at different positions along the vertical section 110. In other embodiments, the imagers may not be housed within the vertically-protruding section 110, but instead housed within the lower housing section 105 and operable to read through the window 115 by using one or more mirrors to direct a field of view through the window 115.

The read module with a view (or multiple views) through window 115 is operative for viewing codes on item surfaces facing away from the checkout clerk 38 (such as customer side 36), without interfering with the checkout clerk's 38 limbs while the object 20 is moved through the read volumes. For viewing codes on the checker side 34, the top surface 165 of the end section 124 may be at the same level 170 as the horizontal surface 132 of the platter 130. To adequately read codes on the checker side 34 of the object 20, a gentle depression 140 is disposed in the otherwise horizontal surface 132 of the platter 130, extending from a position proximate the window 135 along a downward slope toward the checker end 124. The depression 140 allows the reading module(s) with view(s) through window 160 to view down to very near the bottom of the object 20 being scanned. A drain channel 145 and/or drain hole(s) 150 may be provided to divert spills and debris from accumulating in the channel 145 near the scan window 160. In some embodiments, the depression 140 feature may be omitted, with reading of the checker side 34 of the object 20 accomplished via reading through the window 135.

The data reader 100 may further include a central indentation 112 formed on the vertical section 110. The indentation 112 may serve to center or stabilize the object 20 being read or weighed that extend over and onto the top surface of the vertical section 110. The indention 112 combines with the arcuate shape of the vertical section 110, as well as with the depression 140, to stabilize the object 20 placed on the weigh platter section 130. Further details and advantages of such a data reader including a depression and a drain channel are disclosed in U.S. application Ser. No. 12/985,271 filed Jan. 5, 2011, the disclosure of which is herein incorporated by reference.

The data reader 100 further includes an upper reader module, in this embodiment configured as a top down reader (TDR) 175 comprising an upwardly extending post body or section 176 extending along a vertical axis that may be generally perpendicular in relation to the horizontal surface 132 of the platter 130. The TDR 175 includes a vertically elongated post section 176 having a first mounting end 177 and an opposing second end 178. The post section 176 may be mounted or otherwise secured to the platter 130 or to the lower housing section 105 adjacent the first end 177 and includes a housing structure 179 supported adjacent the second end 178. The housing structure 179 is sized and dimensioned to house the imager(s) or read module 181 operable for capturing a top down view of the object 20 as well as potentially providing (from its orientation as shown in FIG. 1) some additional reading capability of the leading side 30 and/or the customer side 36. Additional details of the imager 181 and its components are discussed below with reference to FIGS. 2 and 3.

The TDR 175 extends to a height position at least equal to or above the vertically-protruding section 110 to effectively capture a top down view of the top surface 26 of the object 20. Generally speaking, the TDR 175 may be positioned at a height approximately two to three times higher than the height of the vertically-protruding section 110. For instance, in one configuration, the vertically-protruding section 110 may have a height ranging from between 2 and 5 inches (5 cm and 12.7 cm), and the TDR 175 may have a height of at least 10 inches (25 cm). Alternately, the vertical section 110 may have a height ranging from 0.5 inches to 5 inches (1.25 cm to 12.7 cm). In such a configuration, the imager 181 on the post 176 may capture an image of the top surface 26 of the object 20 when the object 20 has a height dimension substantially equal to or larger than the vertically-protruding section 110. In some instances, such as for smaller objects 20, the imaging system in the vertically-protruding section 110 may be capable of capturing the optical code even when present on the top side 26 of the object 20. But for larger objects 20 having a height approximately equal to or larger than the vertically-protruding section 110, the imager 181 positioned in the post 175 may have an adequate view angle of the top side 26 to capture the optical code thereon. Further embodiments and description of relative heights and configurations for a TDR are set forth below.

In one embodiment, the post 176 is positioned adjacent the customer end 122 in a corner structure 123 behind the vertically-protruding section 110 of the data reader 100. In other embodiments, the post 176 may be positioned at any other desired location on the platter 130. For instance, the post 176 may instead be on an opposite corner of the data reader 100, such as behind window 115b (for optimizing left to right object sweep performance), behind window 115 (for symmetric sweep performance), or arranged at any position behind the vertically-protruding section 110. In some embodiments, the post 176 may be supported on and extend from the vertically-protruding section 110 instead of extending from the horizontal surface 132 of the platter 130. In other embodiments, the post 176 may be mounted to the lower housing section 105 through a hole or cutout in the platter. Although the TDR 175 is illustrated as being adjacent the customer 40, in another arrangement, the TDR 175 may instead be positioned near the check-out clerk 38. In such embodiments, it may be advantageous to position the TDR 175 so as to avoid interfering with the range of motion or visibility of the checkout clerk 38, thus the TDR 175 is illustrated as being outside the typical item path across the platter 132.

In yet other embodiments, the imager 181 may be mounted remotely, such as to a check-writing platform or electronic card reading device located proximate the data reader 100. In such embodiments, the post 176 may be omitted. It should be understood that the described arrangements are meant only to illustrate example embodiments and other arrangements for the TDR 175 and post 176 not specifically described herein may be possible without departing from the principles of the disclosure.

The post 176 may be fabricated as a single unitary part of the data reader 100 and/or may be rigidly attached or screwed into an internal structure of the platter 130. In some embodiments, the post 176 may be manufactured as a separate, standalone component configured to be releasably coupled to the platter 130 to maximize versatility of the data reader 100. For instance, the first mounting end 177 of the post 176 may be threaded or have a mounting surface and the platter 130 may include a corresponding opening or bore with matching threads sized to receive and engage the threaded first end 177 so that the post 176 can be threaded and secured into the platter section 130. The platter section 130 may include a number of such threaded bores positioned at various points, such as, for example, one or more openings along the end 122 and on the vertically-protruding section 110 as previously described. When the TDR 175 is connected/assembled with the lower reader structure, the combination forms an integrated scanner comprising the base data reader 100 and TDR 175.

This flexibility not only provides additional versatility to the overall data reader 100, but may also provide easy access to replace or upgrade the post 176 (e.g., provide a different post height), repair a malfunctioning TDR 175, or repair/upgrade components of the imager 181, without having to replace the entire data reader 100. In other embodiments, other suitable mating mechanisms or keyed features may be used to releasably attach the post 176, such as, protruding tabs and matching grooves, pins and slots, magnets, snap-fitting features, and other suitable connection/attachment mechanisms.

In some embodiments, such as where the platter 130 is a weigh platter, that is, where the platter 130 is configured for measuring the weight of an object 20, the structure 123 may be separate from the weigh platter 130 so as to have no effect on the weight of objects 20. For instance, the weigh platter 130, including the vertically-protruding section 110, may form one unitary structure sitting on a load cell for weighing the object 20, and the structure 123 (or the entire region extending behind the vertically-protruding section 110, that is, the section adjacent the customer 40 in FIG. 1) may form a separate structure unconnected to the weigh platter 130 and the load cell. In such a configuration, as long as the object 20 contacts the weigh platter 130 and/or the vertically-protruding section 110, the object 20 will be properly weighed. The weight of the TDR 175, however, will not be sensed by the weigh platter 130. In such a configuration, though, care should be taken to avoid resting or leaning objects against the post 176 because if an object 20 leans against the post 176, the weigh platter 130 may read a lower weight for the object 20 since the post 176 will bear a portion of the weight.

In other embodiments, the added weight of the TDR 175 (regardless of its position) may be accounted for by zeroing the weight of the data reader 100 when no object 20 is present. In such embodiments, the data reader 100 and the TDR 175 may include wireless power and communication means so as to avoid any cabling from interfering with the weight measurement. After the data reader 100 has been zeroed, any reading by the platter 130 would be attributable to the object 20 and not to any features of the data reader 100. Such a configuration may be advantageous to provide accurate weighing of objects 20 regardless of whether the object 20 is leaning against the vertically-protruding section 110, or the post 176, or both. Such a configuration would work well for data readers 100 with multiple attachment points for the post 176 (or for varying weights of the different TDRs 175 or posts 176) because the weight of the TDR 175 will not be part of the weight of the object 20 as long as the weigh platter 130 is properly zeroed out prior to weighing the object 20.

Figure 2:
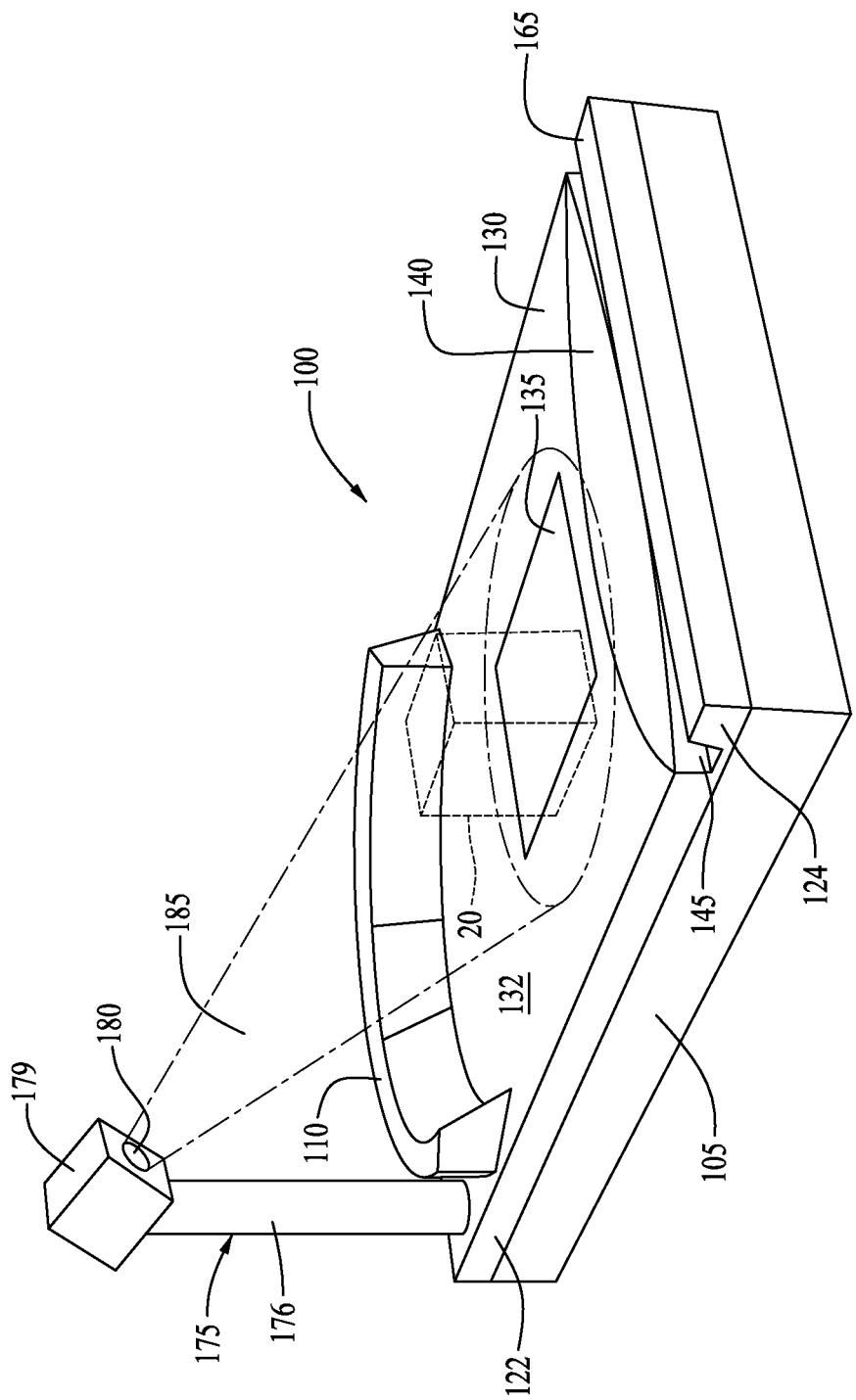
FIG. 2 is an isometric view of the data reader of FIG. 1 illustrating an example field of view of a top down reader (TDR).

The housing structure 179 is positioned on the post 176 and includes a scan window 180 generally facing toward the platter 130. The housing structure 179 is preferably sized and dimensioned to house the imager 181, which is operative for viewing optical codes on at least a top surface 26 of the object 20 through the scan window 180. FIG. 2 illustrates an example field of view or perspective 185 of the read module or imager 181 from the customer's side 40. The field of view 185 of the imager 181 exits the housing 179 through the scan window 180 and preferably covers substantially a majority of the horizontal surface 132 of the platter 130 so as to minimize the possibility of missing optical codes on objects 20. Preferably, the field of view 185 spans at least across the area of the scan window 135 to ensure that optical codes on objects 20 passing through that region are also being read by the imager 181. It should be understood that the field of view 185 designated in the figures is for illustration purposes only and not meant as limiting. The field of view 185 may be designed/selected depending on a number of factors, such as position of the post 176, depth of field/focus of the lens system(s), other characteristics of the imager 181, or the design of the checkout counter.

Figure 3:
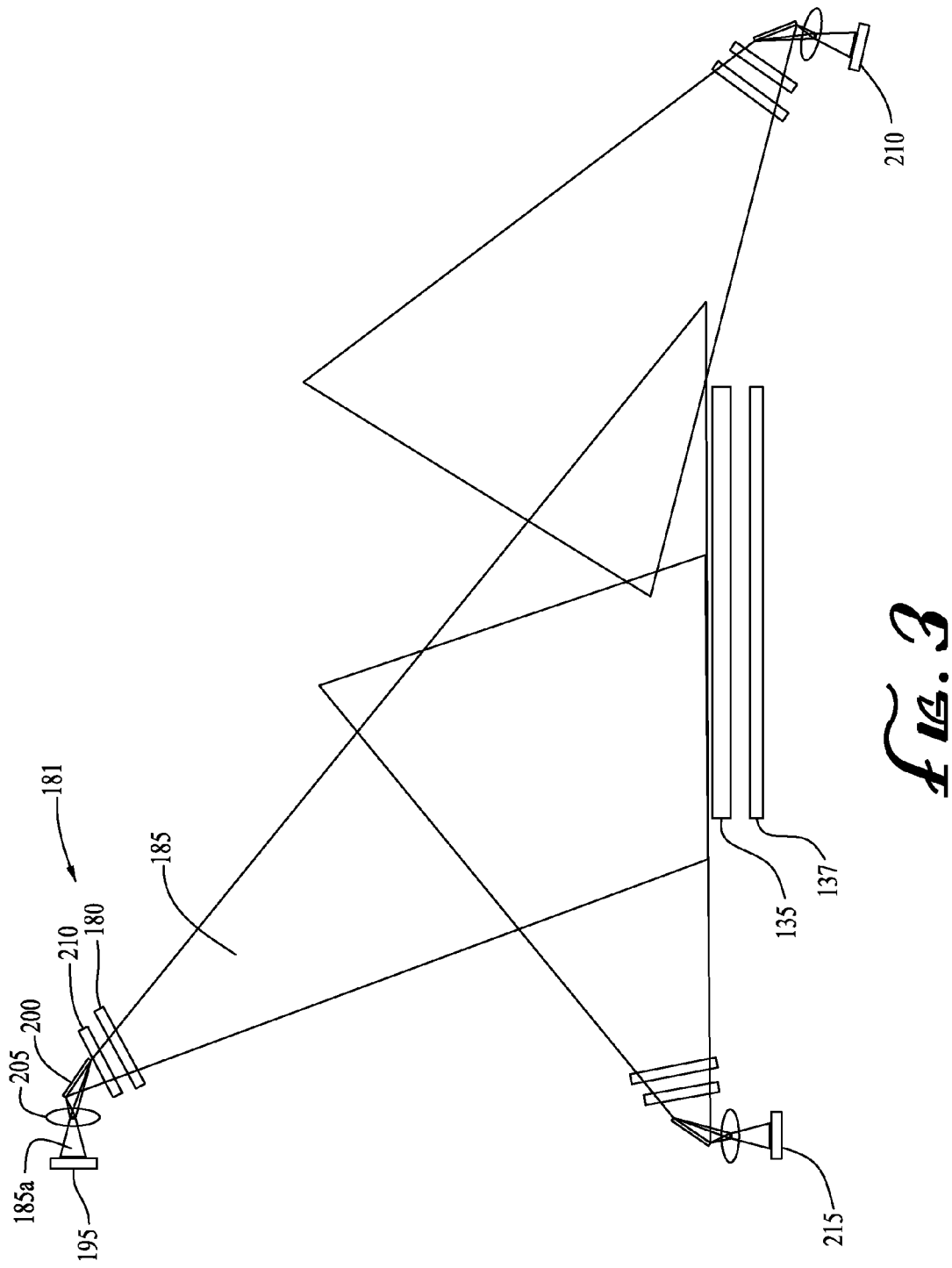
FIG. 3 is a schematic of scan regions and imaging components for the data reader of FIGS. 1-2.

FIG. 3 illustrates an example embodiment for imaging system components of the data reader 100 that may be operative for reading optical codes on an object 20. Most of the enclosure components have been removed to reveal the interior optical arrangement of the imaging systems. For reference, the upper horizontal window 135 disposed in the platter 130 from FIG. 1 is included in FIG. 3, with a lower horizontal window 137, not shown in previous figures, disposed below the upper horizontal window 135. Typically, in some embodiments where the data reader 100 includes a scale (and thus the data reader is a scanner-scale system), the entire horizontal housing portion 130 comprises a weigh platter supported on a load cell in accordance with a suitable construction. The lower horizontal window 137 serves to seal off the internal components within the lower housing section 105. The internal/lower window 137 may also permit the platter 130 to be removable without exposing internal components.

Components of the imaging systems will be described with reference to imager 181. It should be understood that the other two imaging systems 210 and 215 may have substantially similar features and characteristics as those described with respect to imager 181. Accordingly, individual features of imaging systems 210 and 215 may be generally described herein. In addition, details for imaging systems configured for capturing the bottom side 28, the leading side 30, and the trailing side 32 may also be generally described herein without much detail. Additional details relating to aspects of such imaging systems may be found in the above-referenced U.S. patent application Ser. No. 12/985,271, the disclosure of which has been previously incorporated herein by reference, but other suitable bottom and side reading configurations may be employed with top down reader and post systems described herein.

With reference to FIG. 3, the top side 26 of the object 20 is primarily viewed by the imager 181 comprising an image sensor or sensor array 195, primary fold mirror 200, lens system 205, and a window 180. The field of view 185 of the imager 181 in the plane of the figure is represented by the regions 185 and 185a. View segment 185a is the field of view of the imager 181 formed by image sensor 195 and lens system 205 before reflection from primary fold mirror 200. The field of view 185 is the same field of view of the imager 181 (image sensor 195 and lens system 205) after being redirected or folded by primary fold mirror 200. As previously described, the field of view 185 is broad enough to overlap at least the surface area of the upper horizontal window 135, but preferably is much larger to cover a substantial portion of the platter 130. In an alternative arrangement, the imager 181 may view the top side 26 of the item 20 directly, without using a fold mirror 200, or may alternately be provided with multiple fold mirrors.

As mentioned previously, the described components of the imager 181 are housed within the housing structure 179 on the end 178 of the post 176. In some embodiments, cabling (such as for communication or power) for the components of imager 181 may be housed within the housing structure 179, or alternatively, may be routed inside the post 176 and directed toward the internal area of the lower housing section 105 of the data reader 100.

Figure 4:
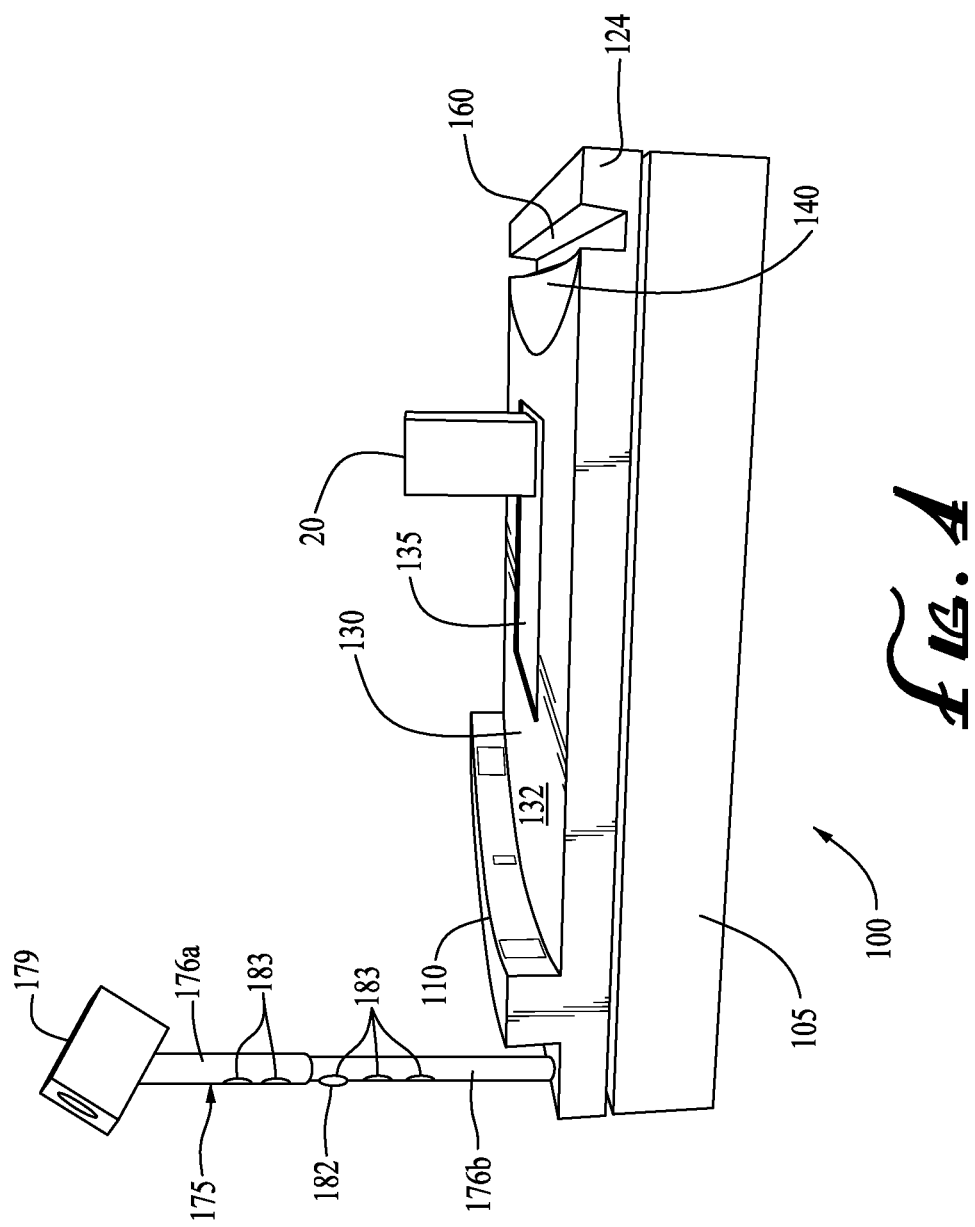
FIG. 4 is an elevated side view of the data reader illustrating an adjustable post with telescoping pole and a locking mechanism.

FIG. 4 illustrates a data reader 100 with a post 176 which may be optionally adjustable to account for a variety of different shapes and sizes of the object 20. For instance, in one embodiment, the post 176 may include two or more telescopic pole sections 176a, 176b configured for extending the post 176 vertically to a desired height. The post 176 may be extended upwardly to accommodate one or more larger sized objects 20. Once those large objects 20 have been scanned, the post 176 can thereafter be retracted downwardly to a desired normal operating position. The post 176 may also include a locking feature to lock the post 176 at the desired height and prevent the post body 176 from inadvertently collapsing or retracting. For example, the post 176 may include a depressible push button 182 and a number of apertures 183 sized to receive the push button 182 for releasably locking the post 176 at a desired height. In an example operation, the push button 182 initially engages one of the apertures 183 to lock the post 176 in the baseline position. To extend the post body 176 to a new height, the push button 182 is depressed and the post 176 is extended to the new height, where the push button 182 engages a different one of the apertures 183 to lock the post 176 at the new height. To retract the post 176, the push button 182 may be depressed and the post 176 retracted until the push button 182 reengages the aperture 183 for the baseline (or any other) position. In one construction, the height adjustment may be user-adjustable, or alternately, may be adjustable only by the checkout clerk 40 or by other service personnel. Alternately, the post 176 may be a factory-set feature enabling designs of different heights to be constructed from common parts. The adjustable pole height may be actuated via a motor, providing for automatic and/or remote-controlled height adjustment.

In another embodiment, the post body 176 may be constructed of a flexible metal or other material and configured to allow for bending and snaking of the post body 176 to move the imager 181 to various positions, as desired. In another configuration, the post 176 may have an articulated design with a number of individually articulating members. For instance, the post body 176 may comprise a plurality of individual leg segments or joints that are each capable of rotating or translating with respect to one another so that the TDR 175 can be arranged in a desired position. In one embodiment, the TDR 175 may be rotated toward the customer 38 so that the imager 181 faces the customer 38. In such configurations, the imager 181 may be configured for reading items presented by the customer 38, such as coupons, discount codes, or other items. Further details and advantages of such embodiments are discussed below with reference to FIGS. 16-23.

In still other embodiments, the post body 176 may simply be rigid and set at a fixed, unmovable position. In yet other embodiments, the data reader 100 may be compatible with and capable of receiving a number of different kinds of TDRs 175, such as the previously described rigid post construction, the telescoping post for adjusting height, or the articulating post for adjusting the imager 181 position, or any combination of the these. For instance, each of these different posts may have a substantially identical mounting end 177 to provide interchangeability of the various post types, as desired.

In some embodiments, the housing structure 179 and the post 176 may be fabricated as a single unitary part or may be formed from two or more separate components that can be coupled or assembled together, such as via mating threads or use of snap-fitting features. In certain embodiments, it may be advantageous for the housing structure 179 and the post 176 to be separate, releasable components so as to provide easy access to the internal components of the imager 181 for repairs and/or maintenance. For instance, if the imager 181 malfunctions, the housing structure 179 may simply be disengaged from the body of the post 176 to allow access for repair/replacement of the internal components of the imager 181. Such a configuration would provide easy access to repair/replace specific components without needing to replace the entire TDR 175. In other embodiments, the housing structure 179 may have removable covers or windows that allow for access to the internal components.

In other embodiments, the housing structure 179 and the post 176 may be coupled in a pivoting relationship, such as by using a ball-and-socket joint or other similar mechanism, to provide a pivotable housing structure 179 for adjusting the field of view 185 of the imager 181 as desired. In some embodiments, the pivotable housing structure 179 may be used in combination with the vertically extendable post 176 to provide for manual adjustment and repositioning of the imager 181 for properly positioning the field of view 185 to capture a desired read region after the height of the imager 181 has been adjusted. In certain embodiments, such as those including an adjustable post or providing adjustment of the top imager, the data reader may employ suitable calibration techniques to ensure the top imager has a proper the field of view.

Figure 5:
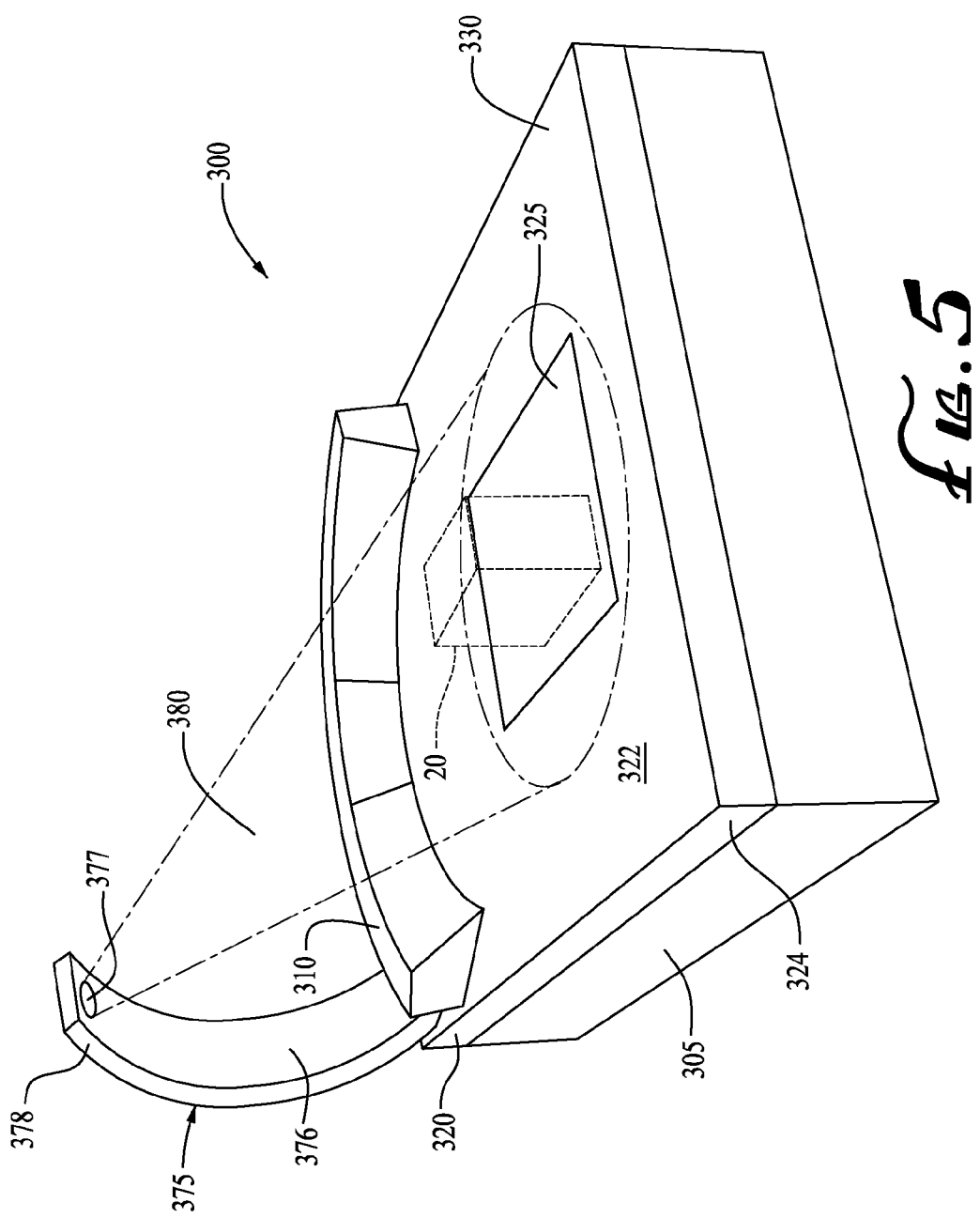
FIG. 5 is a perspective view of a data reader illustrating an example field of view of a top down reader according to a third embodiment.
Figure 6:
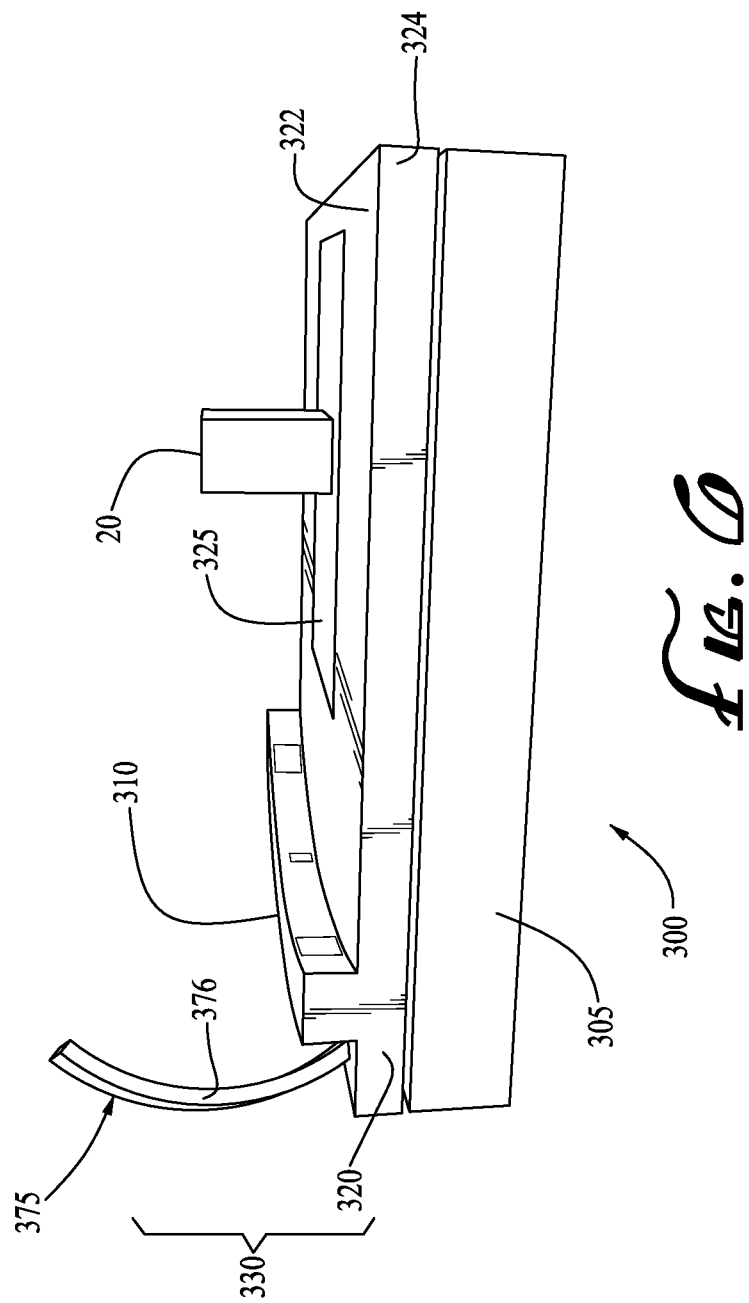
FIG. 6 is a side view of the data reader of FIG. 5.

FIGS. 5-6 illustrates an alternate data reader 300 similar to the previous embodiment of the data reader 100 of FIGS. 1-4. It should be understood that many of the same or similar features described with respect to the embodiment in FIGS. 1-4 are applicable to the embodiment illustrated in FIGS. 5-6. To avoid obscuring more pertinent aspects of this embodiment, descriptions of those features are not repeated.

The reader 300 includes a lower housing section 305 and an upper section 320. As in the previous embodiment, the upper section 320 may comprise a housing section, a cover or platter section, such as a weigh platter. Unlike the previous embodiment, however, the reader 300 includes an elongated horizontal window 325 disposed in the horizontal platter 322, the window 325 extending to a position near lateral edge of the end section 324. Additional features and advantages of the data reader 300 having an elongated horizontal window 325 are described in detail in the above-referenced U.S. application Ser. No. 12/985,271, the disclosure of which has been previously incorporated herein by reference.

Also unlike the previous embodiment, the TDR 375 may comprise an arcuate body 376 mounted to the upper section 320 adjacent the vertical section 310. Similar to the first embodiment, the TDR 375 may be positioned at any desired position on the data reader 300 and/or may be releasably coupled to the data reader 300 in a similar fashion as described with respect to the embodiment in FIGS. 1-4. The TDR 375 includes an imager (details of one example will be described below with respect to FIGS. 10-13) housed within an upper section 378 of the post 376 and operative for reading optical codes on an object 20 through the window 377 along the field of view 380. The imager may have similar components and functionality as the imager 181 described previously and illustrated in FIG. 3.

Both the first embodiment of data reader 100 and the second embodiment of data reader 300 are configured with a low-profile vertical section 110 or 310, respectively. Other configurations, including configurations with higher profiles, for these vertical sections may be employed, such as those vertical section configurations disclosed in U.S. Pat. Pub. Nos. 2010/0163626 and 2010/0163628, the disclosures of which are hereby incorporated by reference. Further, for a scanner-scale application, the weigh platter may be configured in a dual plane configuration such as the All-Weighs® platter available from Datalogic ADC, Inc. of Eugene, Oreg. or as described in U.S. Pat. No. RE 40,071, the disclosure of which is hereby incorporated by reference.

Depending on the layout of the data readers 100, 300 and/or the checkstand arrangement, ambient lighting for the imager 181 may be sufficient to provide adequate illumination for capturing the optical codes from the object 20. In some embodiments, additional light sources may be added. For example, in the data reader 100 of FIGS. 1-4, light sources may comprise any suitable light source such as a row or array of one or more LEDs (Light Emitting Diodes) mounted in or on an exterior portion of the housing structure 179 and pointed into the view volume and positioned to illuminate an object 20 with respect to one or more perspectives. The LEDs may be disposed on the housing structure 179 or may be mounted internally behind the scan window 180 or behind a separate window. Any suitable number of LED arrays may be employed. In some embodiments, different wavelengths of light are directed to illuminate different regions of an object from different perspectives. A mix of wavelengths may maintain good performance with a variety of labels while reducing the perceived brightness to the human eye. It is further noted that the higher wavelengths may provide for better ergonomics (i.e., look dimmer to the eye), but the trade-off may be that some labels become more difficult to read. In some embodiments, the one or more of the light sources may be operated in a pulsed mode, the pulsing synchronized with the imager frame rate or a multiple thereof. In one example, the imagers may be selected with a frame rate of 30 Hz and one or more of the light sources used to illuminate the read region are pulsed at 60 Hz. Additional examples of light source pulsing is described in U.S. Pat. No. 7,234,641 the disclosure of which is hereby incorporated by reference.

The internal optics and other details related to various structures of the data readers 100, 300 have not been described herein in great detail, but detailed aspects are described in the above-referenced U.S. patent application Ser. No. 12/985,271, the disclosure of which has been previously incorporated herein by reference. The internal optics and structures of the data readers 100, 300 may be substantially the same as or identical to the embodiments described therein.

Figure 7:
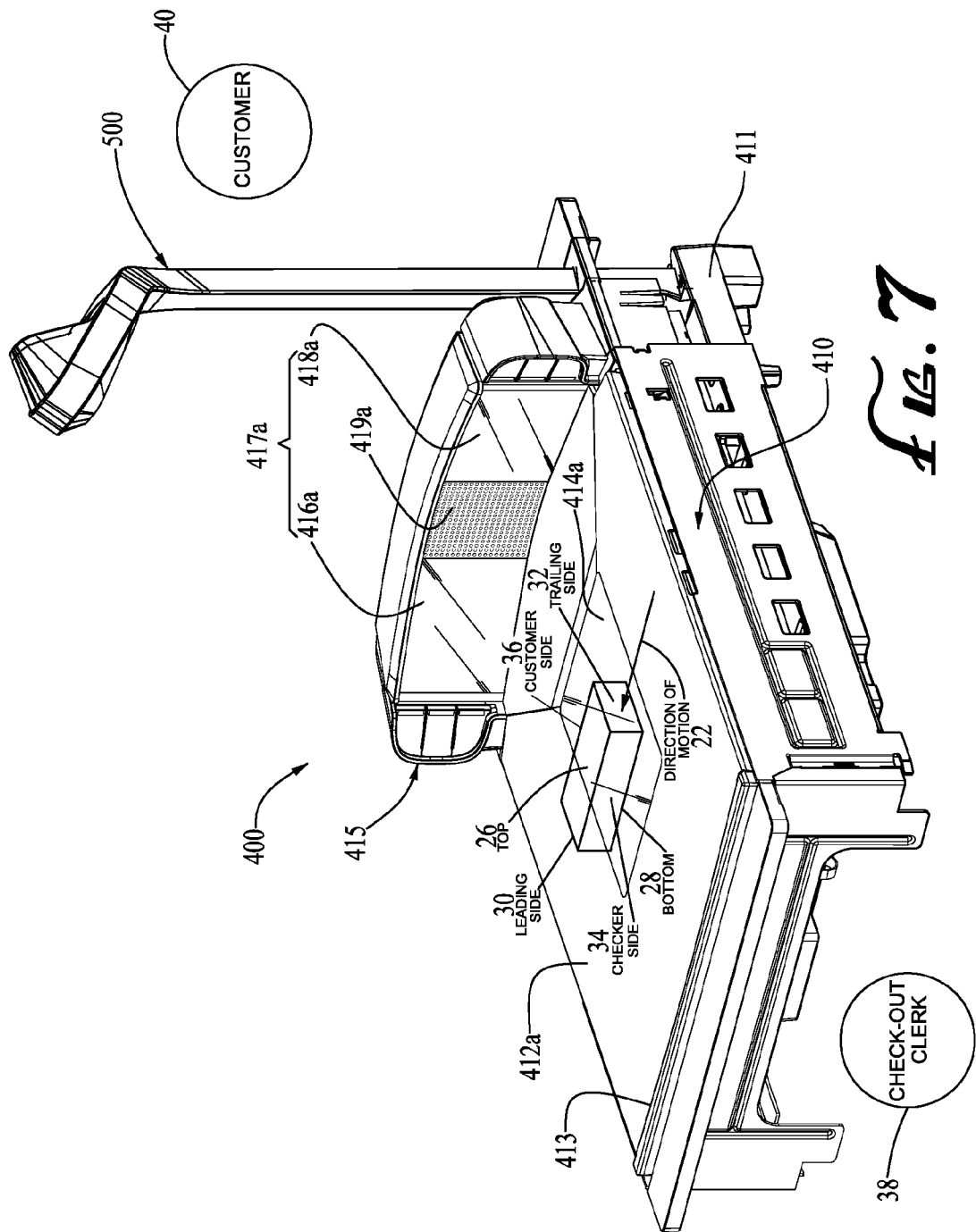
FIG. 7 is a front isometric view of a data reader according to another embodiment and further illustrating an exemplary six-sided box-shaped object that may be passed through a view volume of the data reader.
Figure 8:
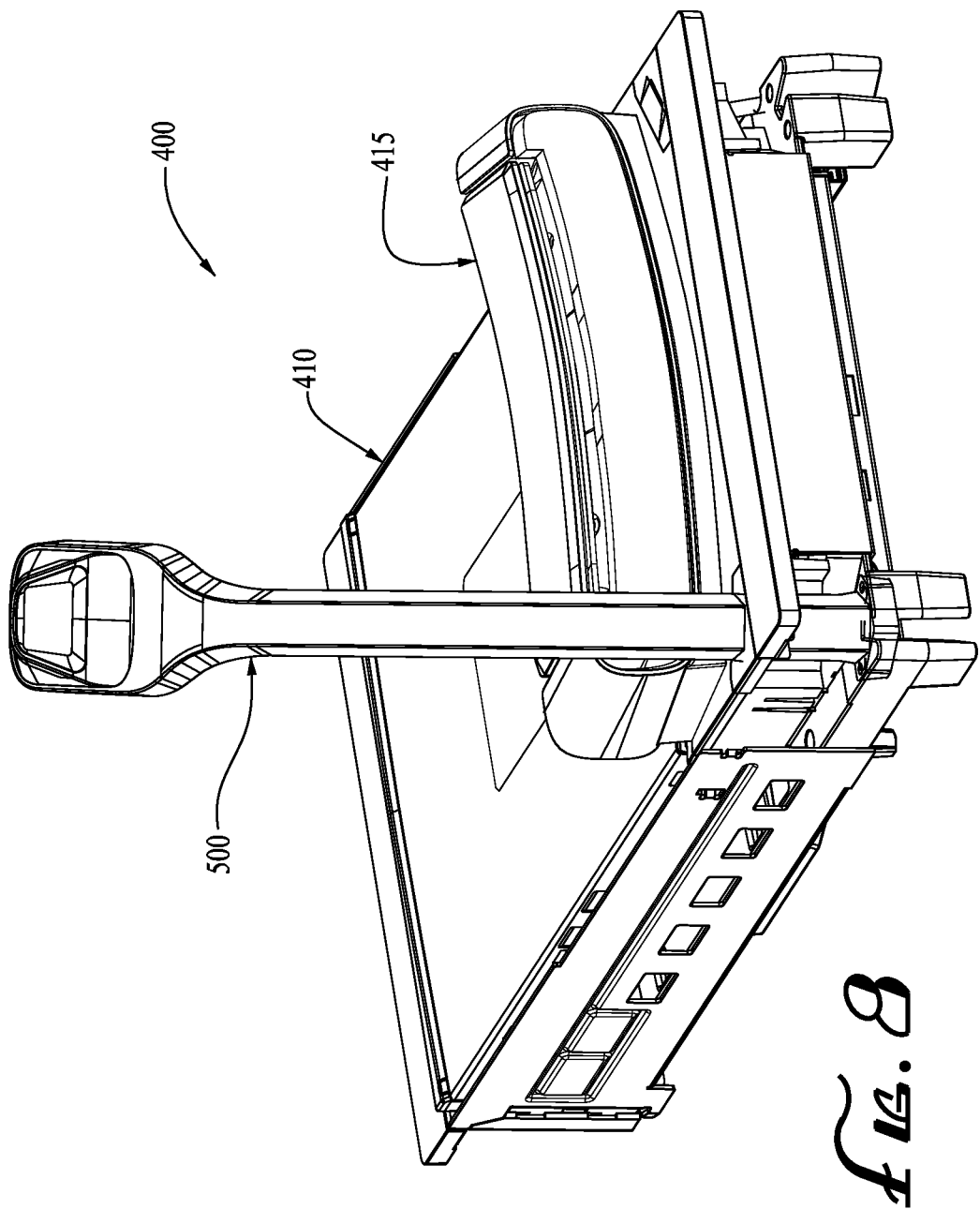
FIG. 8 is a rear isometric view of the data reader of FIG. 7.
Figure 9:
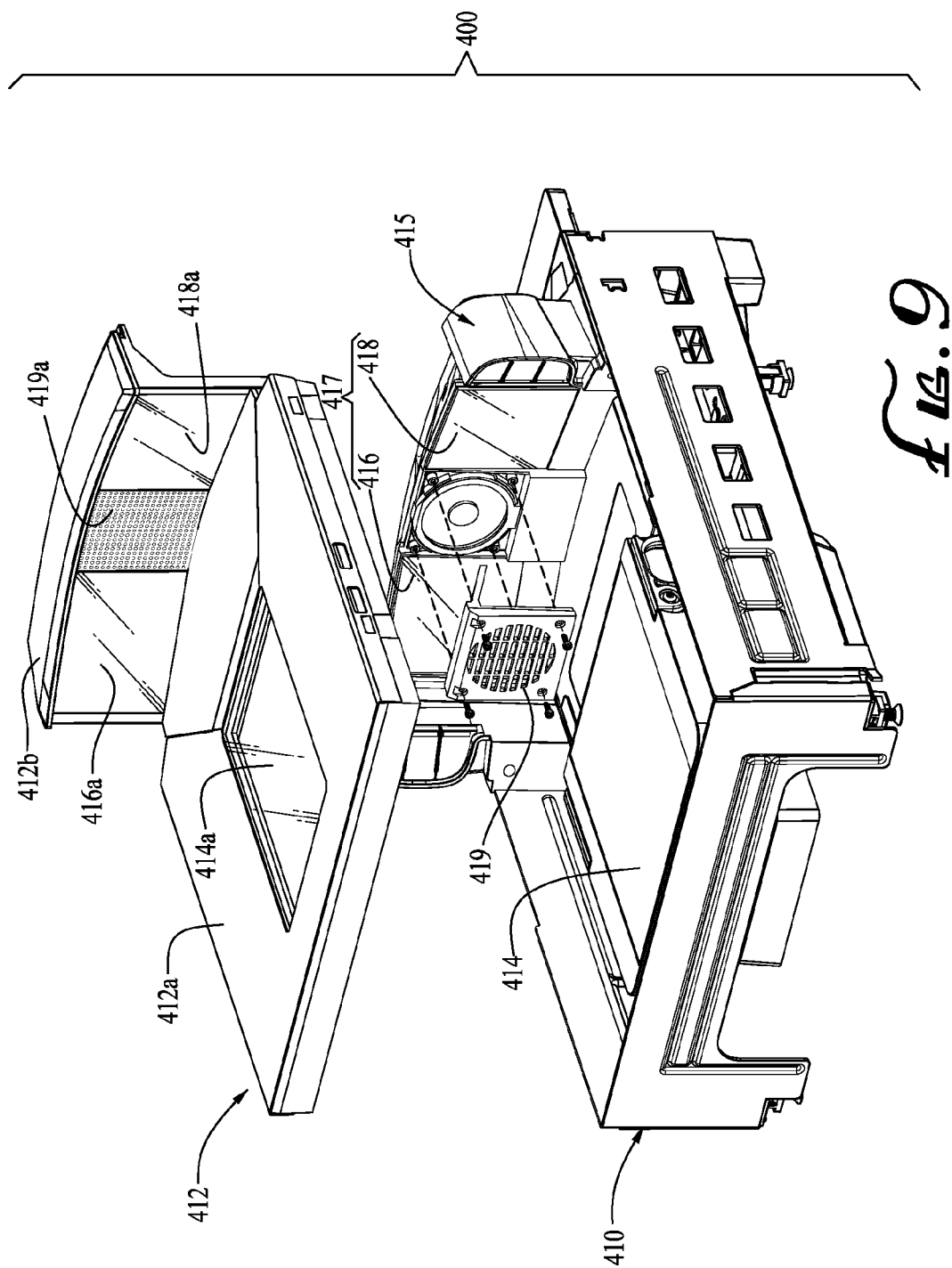
FIG. 9 is a front isometric, partially exploded view of the data reader of FIGS. 7-8.
Figure 10:
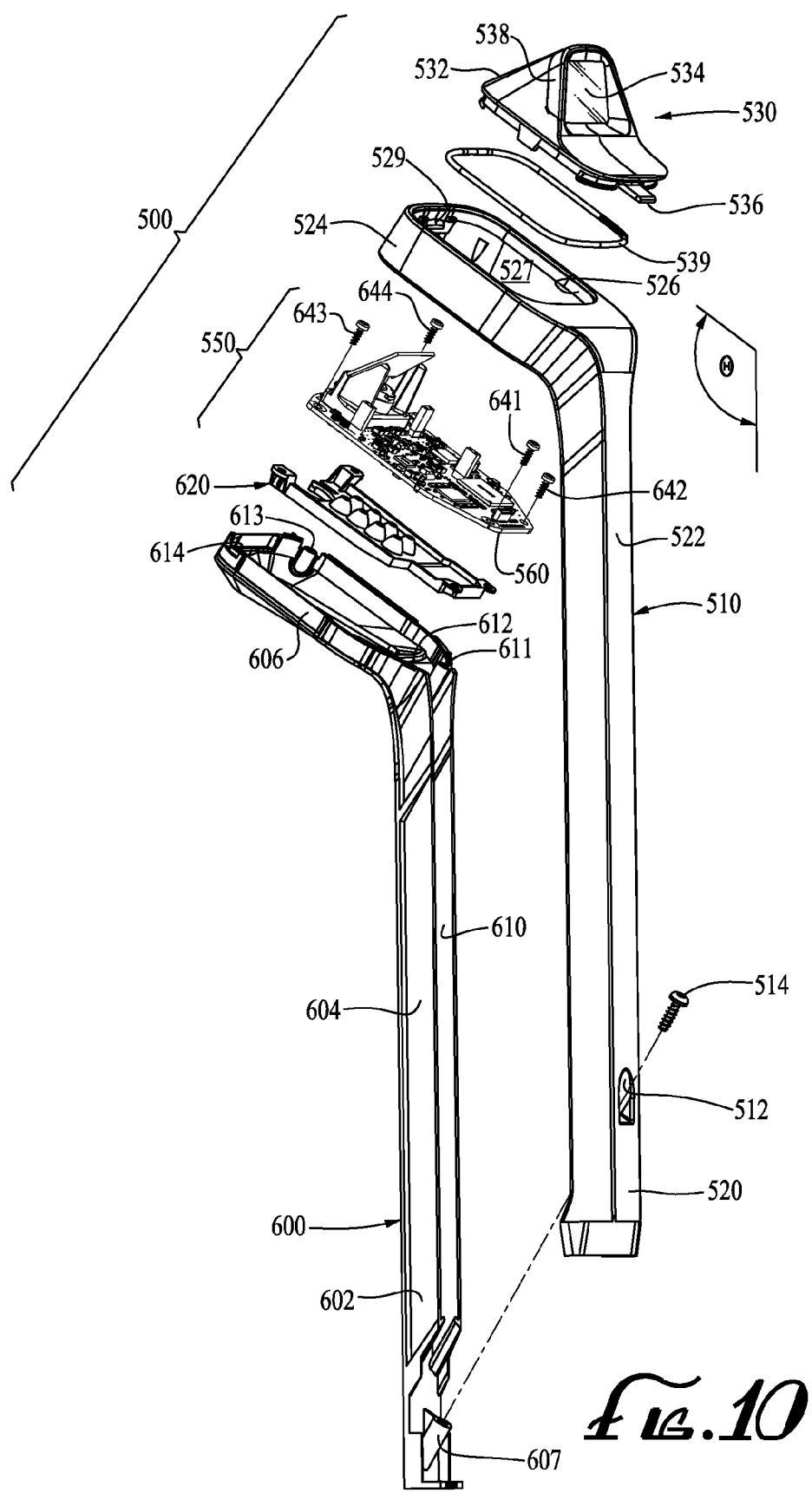
FIG. 10 is a rear top exploded isometric view of a post-mounted top down reader section of the data reader of FIGS. 7-8.
Figure 11:
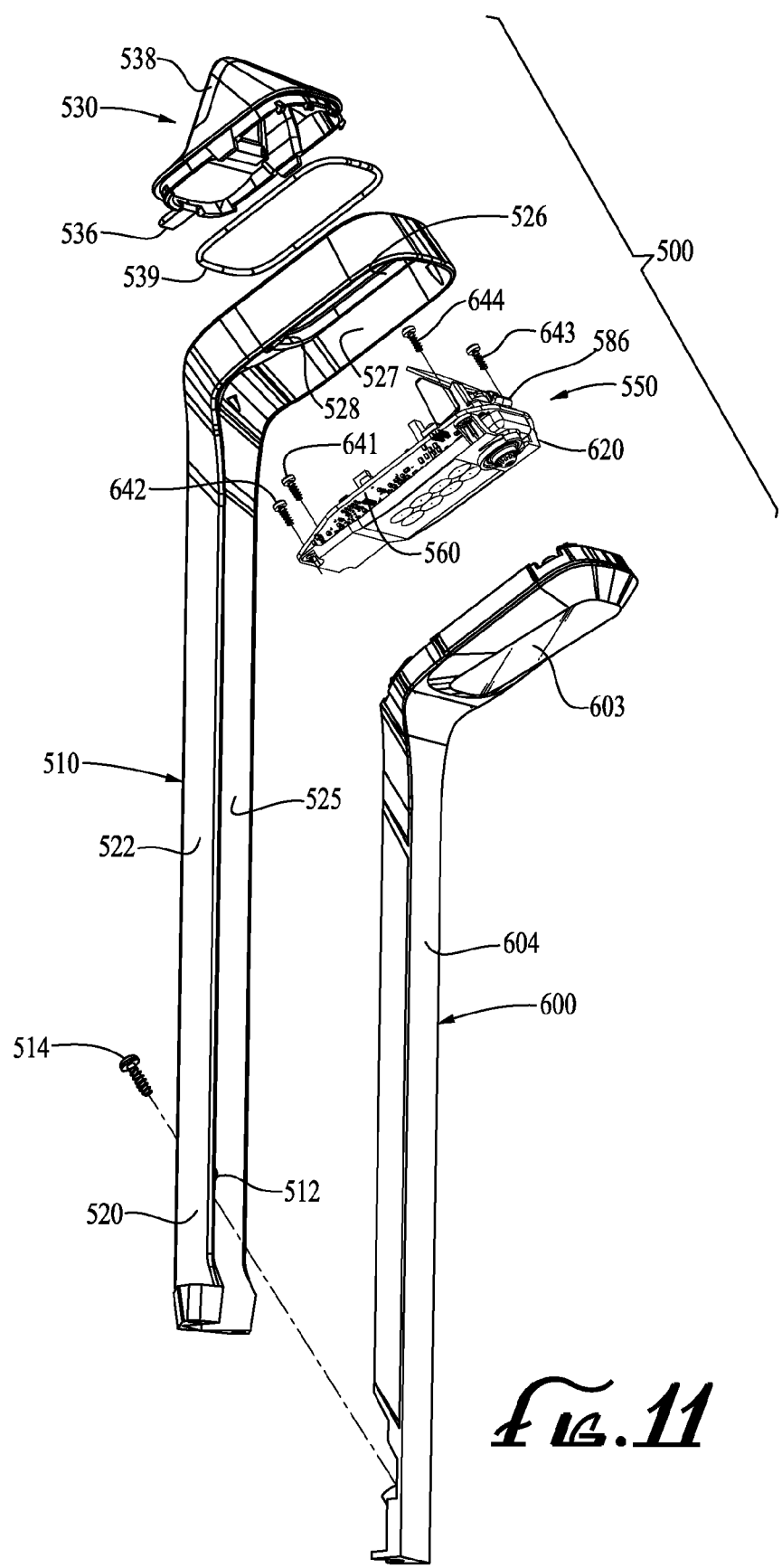
FIG. 11 is a front bottom exploded isometric view of the top down reader of FIG. 10.
Figure 12:
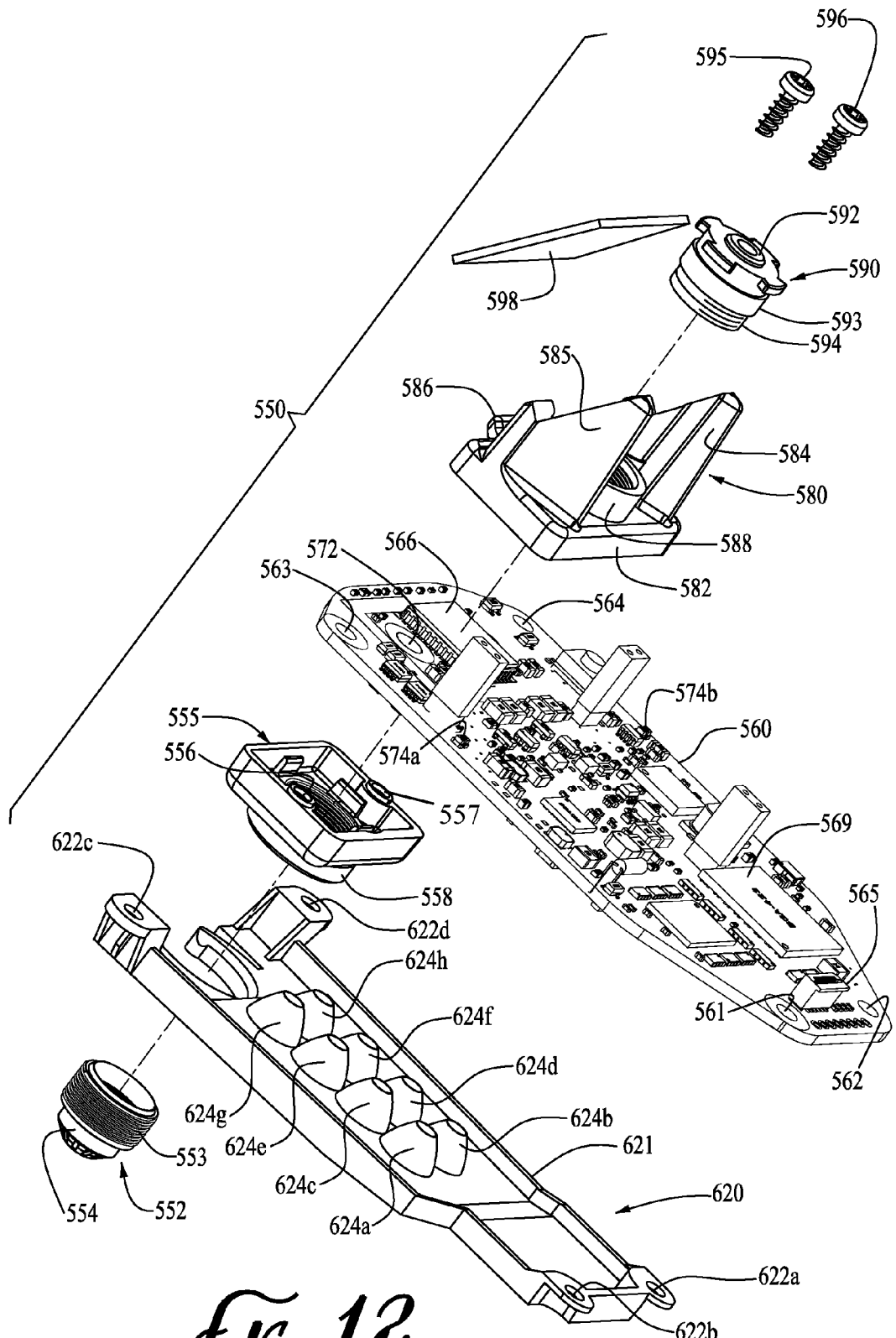
FIG. 12 is a top side exploded isometric view of the imaging optics and electronics component of the top down reader section of FIGS. 10-11.
Figure 13:
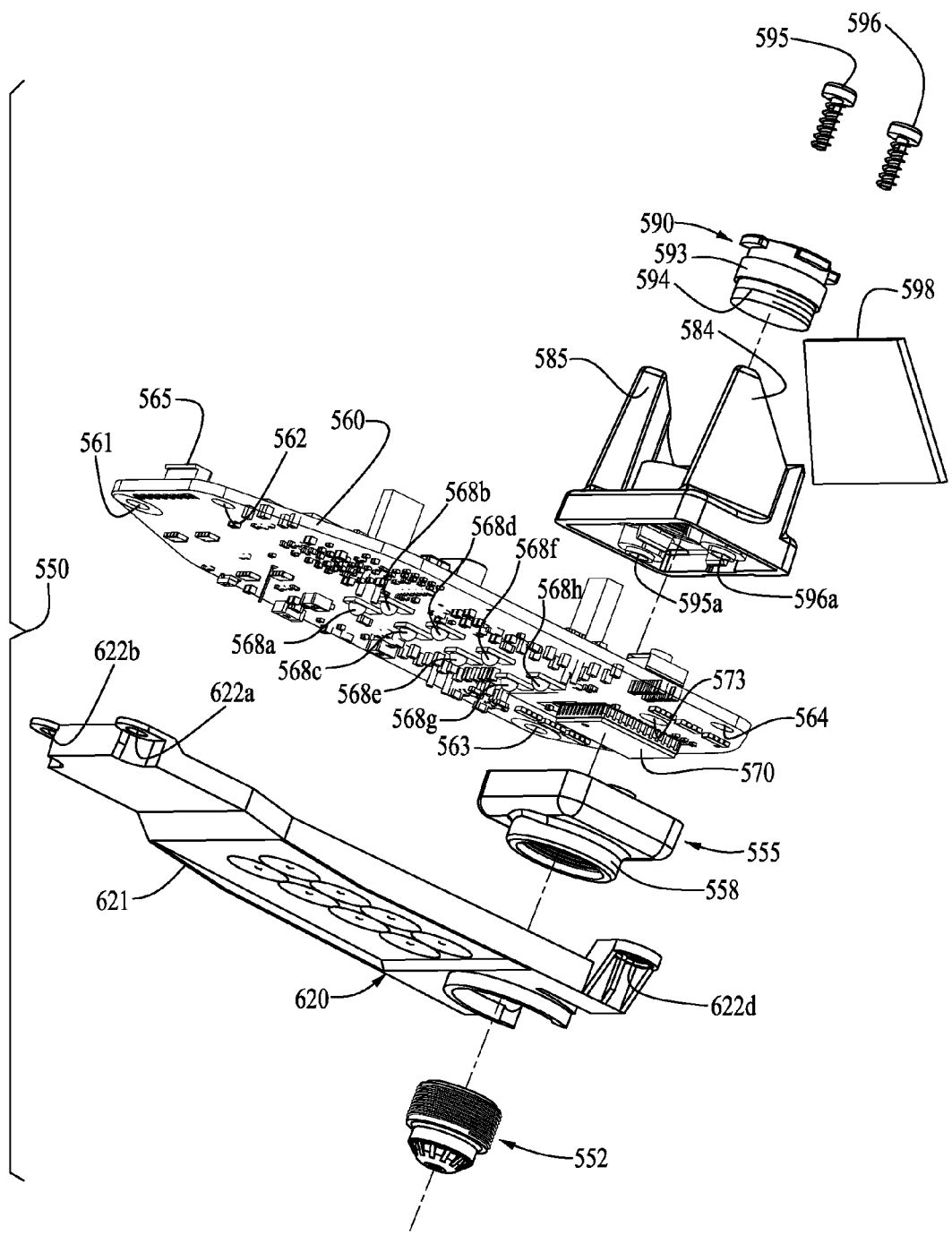
FIG. 13 is a bottom side exploded isometric view of the imaging optics and electronics component of FIG. 12.
Figure 14:
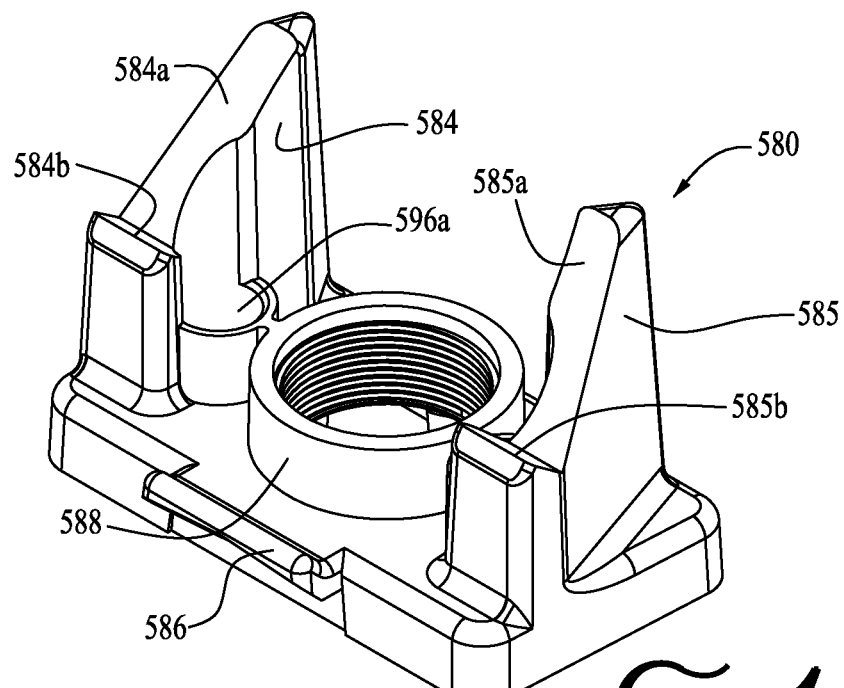
FIG. 14 is a top side isometric view of the upper mirror mount and lens assembly frame element of FIGS. 12-13 on an enlarged scale.
Figure 15:
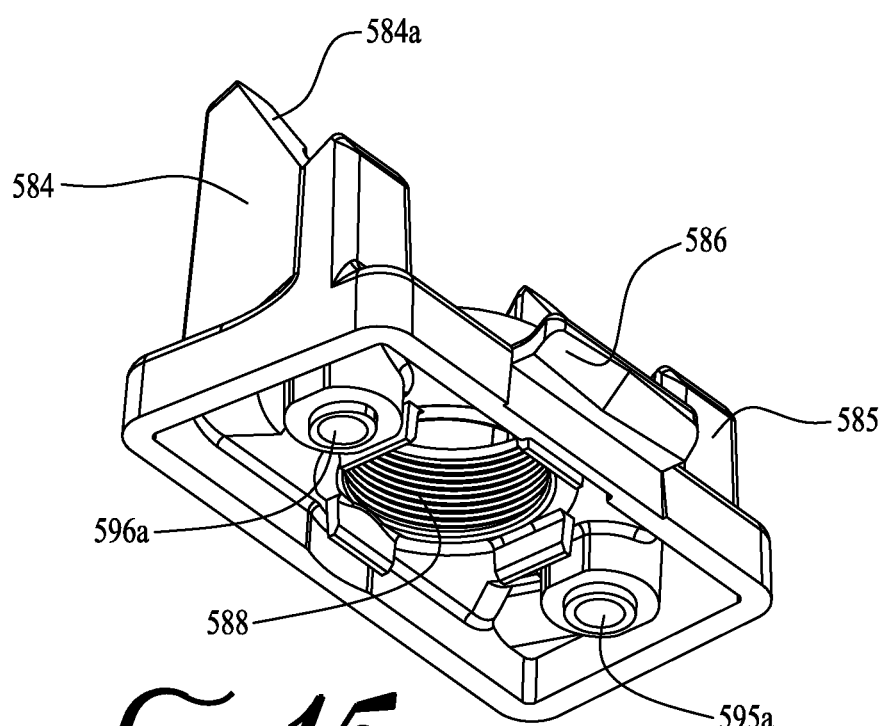
FIG. 15 is a rear side isometric view of the upper mirror mount and lens assembly frame element of FIG. 14.

FIGS. 7-9 illustrate details for a data reader 400 according to another embodiment. The data reader 400 includes a multiple window reader having a lower section 410 and an upper section 415 arranged generally orthogonally to one another. The lower section 410 includes a horizontal window 414. The vertical section 415 in this embodiment includes a split window 417 with a first window section 416 and a second window section 418, the window sections 416, 418 divided by the grille 419 disposed therebetween. The components of the data reader are mounted (directly or indirectly) to a common base or chassis 411. The chassis 411 is preferable made of a conductive material, such as metal, providing a grounding path for the device electronics.

The reader 400 is provided with a cover/platter, which is preferably removable, and which (in the scale version) may comprise a weigh platter 412. Preferably the cover/weigh platter 412 includes both horizontal 412a and vertical 412b sections in a dual plane configuration (as well shown in the partially exploded view of FIG. 9) such as the All-Weighs® platter available from Datalogic ADC, Inc. of Eugene, Oreg. or as described in U.S. Pat. No. RE 40,071, the disclosure of which is hereby incorporated by reference. The platter upper section 412b includes a split window 417a with a first window section 416a and a second window section 418a, the window sections 416a, 418a divided by the grille 419a disposed therebetween. The platter lower section 412a includes a horizontal window 414a disposed in a recessed area and preferably mounted flush with the surface of the platter section 412a. The horizontal portion 412a of the weigh platter 412 may include a bump or raised section 413 which also may be referred to as a rail for inhibiting items such as spherical fruit from rolling off the edge of the platter section 412a during weighing operation.

The data reader 400 may be configured in different lengths to accommodate different checkstand sizes or configurations, or different configurations at the POS (point of sale). For example, it is noted that the exploded view of the reader 400 in FIG. 9 is illustrated as a slightly shorter version than the data reader 400 of FIG. 7-8 and the platter 412 in FIG. 9 is illustrated without the optional fruit rail 413 shown in FIGS. 7-8.

As previously described, for similar purposes of discussion, as shown in FIG. 7, the data reader 400 may be described with reference to an object 20 represented as a six sided, box shaped package being passed through a read region above the window 414a and to the sides of windows 416a, 418a. Depending upon the size of the object 20 being passed through the read region, the object 20 typically being dragged across the surface of the platter 412a, it may be unlikely/difficult or even impossible for views out of the windows 416a, 418a to have a view of the top side 26 of the object 20 in order to read an optical code on that top side. In order to improve such top side reading, the optional post-mounted top down reader (TDR) 500 is provided. The TDR 500 may also provide, from its orientation as shown in FIG. 7, some additional reading capability of the trailing side 32 and/or the customer side 36. The details of the TDR 500 are now described with reference to FIGS. 10-22.

In this embodiment, as in the prior embodiments, the data reader 400 is configured as a two plane data reader 410/415 with horizontal window 414 and vertical window 416/418. The TDR 500 may be implemented with other base data reader configurations such as a reader with only horizontal window(s) or a reader with only vertical window(s). The base data reader may include other reading apertures such as the checker side window disclosed in U.S. 2011/0168780 hereby incorporated by reference.

The TDR 500 includes a main body frame section or post 510 which may be constructed of aluminum or some other metal, plastic, or other suitable material. The main post/housing section 510 (which also may be described as a frame section) is shown in a one-piece aluminum metal construction. The housing section 510 includes a lower section 520, a central section 522, and an upper section 524, the section 524 being disposed at an inner angle $\theta$ (see FIG. 10) of about 135 degrees to the vertical sections 522, 520, such that the center of the field of view aligns with the center of the horizontal window 414a. The upper section 524 includes a central cavity and opening 526, forming an upper open basket or ring-shaped section into which the top down reader module components are installed. The lower section at the bottom end is directly connected to the chassis 411 of the base scanner, such as via a screws, bolts or other suitable mounting method, and thus when connected/assembled forms an integrated scanner comprising the base data reader 400 and TDR 500.

The primary components of the TDR 500 include: (a) the top down reader (TDR) module (comprising internal optics and electronics 550, 620), (b) the main pole/post housing frame or frame section 510, (c) a front enclosure 600, and (d) a back enclosure 530. Each of these components will be described in further detail in the following. The one-piece metal construction for the post/housing or frame section 510 may provide various advantages/attributes which may include: minimize tolerance stack up for locations of TDR components (the components all being mounted to a common housing structure), ease of assembly due to fewer parts, structural integrity/stiffness and impact tolerance/strength due to the metal and lack of assembly joints, and electrostatic discharge (ESD) protection. In one construction, all the plastic-to-plastic part seams are molded-in, so there are no air gaps therebetween. Thus, the only point of ESD ingression available is the seam between the metal pole and the plastic enclosure parts. Since the electrically conductive pole is directly tied to the base scanner housing which is tied to earth ground, the electrostatic discharge has a path to earth ground without entering the circuit.

The front enclosure 600 may be made of injection molded plastic, and include a lower section 602, a central section 604, an upper section 606 and a window 603. In one example construction, the window 603 is first formed (e.g., injection molded from an optical plastic) separately, and then is insert-molded into the upper section 606 of the front enclosure 600. Alternately, the window may be attached via any suitable method (such as formed via co-molding or formed/molded separately) and then assembled (e.g., attached via adhesive, snap-fit or other attachment). The front enclosure 600 is inserted into and mates within the internal cavity 525 of the post section 510, forming an enclosed cavity therebetween for enclosing and containing the internal components 550 and 620. The internal cavity 525 runs the length of the post section 510 providing a channel/pathway and protection for cabling from the PCB 560 to the bottom section 520, and to the base scanner.

The optics and electronic sections 550 and 620 are described in further detail with respect to FIGS. 12-15. The electronic section 550 includes a PCB 560 on which are mounted various components including processor 569, top imager 566, bottom imager 570, LED array (comprised of eight illumination LED's 568a, 568b, 568c, 568d, 568e, 568f, 568g, 568h on the bottom side of the PCB 560), indicator LEDs 574a, 574b (on the top side of the PCB 560) as well as other electronics such as the cable connector 565. The PCB 560 includes several through holes including four corner holes 561, 562, 563, 564. The PCB 560 also includes two other holes 572, 573 on opposite sides of the top imager 566.

A top imaging optic assembly includes an upper mirror mount and lens assembly frame 580 and a lower imager lens frame 555. Details of the upper mirror mount and lens assembly frame are illustrated in detail in the enlarged views of FIGS. 14-15. The upper imaging frame 580 (preferably constructed as a single plastic-molded piece) includes a body section 582 with left and right wing sections 584, 585. The wing sections 584, 585 extend upwardly from the base section 582 and provide a mounting surface for mirror 598, which when the mirror 598 is mounted thereon, position the mirror 598 at an angle of approximately 135 degrees to the (vertical) view of the top imager 566 through the lens assembly 590 thereby directing the view out horizontally (i.e., 90° to vertical). The lens assembly 590 includes lens element(s) 592 and lens housing 593 with a male threaded section 594. The lens assembly 590 is mounted by screwing the male threaded section 594 into a corresponding female threaded section 588 in the frame 580. The imaging frame/housing 580 thus comprises a common mounting structure for both the lens assembly 590 and the mirror 598 which may facilitate easy alignment and minimize tolerance stack-up between these optical components, and may allow for enhanced compactness. The common mounting structure may also allow: for minimizing the size of the mirror 598 as well as minimizing the margin/spacing needed for the exiting optical path through the window 534 without clipping the window frame.

The mirror 598 is shown face-mounted to the top (slanted) edges of the wing sections 584, 585, secured by two-sided tape disposed between the front face (peripheral edges) of the mirror 598 and the respective mounting surfaces 584a, 584b of the wing sections 584, 585. The mirror 598 is aligned via the bottom edge of the mirror 598 abutting the stops or ledges 584a, 584b at the ends of the mounting surfaces 584a, 584b. The face-mounted construction is operative to hide/obscure the mirror edges. The mirror 598 may alternately be secured by any suitable attachment/mounting mechanism such as via adhesive or clips. Alternately, the mirror 598 may be rear-mounted, whereby the wing sections 584, 585 are provided with a shoulder or other mounting surface for accepting the mirror 598.

The frame 580 allows for mounting the mirror 598 directly to the lens holding structure. The configuration of frame 580 may be utilized with other reader systems, such as a stand-alone scan module. Alternately, the mirror 598 may be mounted to the back enclosure 532 such as via two-sided tape.

The mirror 598 may optionally be omitted, and in such a configuration the field of view from the imager 566 may face upwardly.

The lower lens mount 555 also includes a body section 558 with a female threaded mount. The lens assembly 552 includes lens housing 553 (with a male threaded section) and an internal lens 554. The lens assembly 552 is mounted by screwing the male threaded section 553 into a corresponding female threaded section 558 in the mount 555. The lower lens mount 555 includes screw bosses 556, 557 (visible in FIG. 12) (or alternately threaded hole mounts). To mount the components in place, screws (or bolts) 595, 596 are passed through holes 595a, 596a in the upper lens mount/frame 580, then through holes 572, 573 in the PCB 560, and then into the thread mounts 556, 557 in the lower lens mount 555 thereby securing both the lower lens mount 555 and the upper lens mount 580 to the PCB 560 with a common attachment.

The upper imager module includes the upper imager 566, lens assembly 590, combined lens/mirror mount 580 and back enclosure/housing 530, shown in position relative to the upper imager 566 mounted on the top surface of the PCB 560. The back enclosure 530 includes a window 534. The upper imager 566 has a field of view up through lens 592 then reflecting off of the mirror 598 and out through the window 534. The window 534 and back enclosure structure 530 may be formed in a one-piece construction. FIGS. 16-22 illustrate details of one example design for the back enclosure structure 530. The back enclosure structure 530 includes a frame section 532, a window 534, and an inverted U-shaped inner light pipe 538 comprising a central portion 538c, a right side leg 538a disposed over LED 574a, and a left side leg 538b disposed over LED 574b. The LEDs 574a, 574b being mounted on the top side of the PCB 560. When assembled, portions of the light pipe 538, namely the legs 538a, 538b, are covered by the back enclosure frame 532 such that only the central portion 538c is externally visible. The window 534 includes a central section 534a (through which the field of view of the upper imager 566 passes) and a lower lip section 534b (which provides a lower mounting surface for connection to the frame section 532).

In one example construction, the light pipe 538 and window 534 are first formed (e.g., injection molded from an optical plastic) separately, and then they are insert-molded into the back enclosure frame 532. Alternately the back enclosure structure 532, the window 534 and/or light pipe 538 may be constructed by any suitable method such as formed via co-molding or formed/molded separately and then assembled (e.g., attached via adhesive, snap-fit or other attachment). The insert-molded components in combination with the previously-described O-ring/seal 539 provide for a hermetic seal, protecting/isolating the internal electronic and optic components from ESD as well as spillage.

In operation, the LED's 574a, 574b are operable to provide an indicator light that is directed into the light pipe 538, through the leg sections 538a, 538b and alighting the light pipe central section 538c. When alighted, the upper portion 538c is visible from the front, back lateral sides and top view of the back enclosure 530. In operation, the alighted system may indicate, for example: (a) that the back enclosure reader is operative for reading an item presented to the window 534, (c) that an item that has been presented to the window 534 has been successfully read. Though the system is illustrated with two LEDs 574a, 574b, the system may be operative with some other number of LEDs. Alternately, the LEDs may be of different colors. In one example, the LED 574a may be a green LED and when alighted, the light pipe 538 will glow green indicating one message (e.g., an item presented was successfully read or that the upper reader is operational). In another example, the other LED 574b may be a red LED and when alighted, the light pipe 538 will glow red indicating another message (e.g., an item presented was not successfully read, or that the upper reader is non-operational). Alternately, multi-color LEDs may be used.

The upper imager 566 thus may be used for scanning small items or for reading coupons or certain identification information from the customer's cell phone, ID card, store affinity card, or other items thereby freeing the checkout clerk from having to handle personal items of the customer. The back enclosure 530 (on side) includes a tongue or protrusion 536 which engages a mating groove or indentation 528 within the upper section 524 of the post 510. The tongue 536 combines with snaps or some other attachment means (such as screws or tape) to secure the back enclosure 530 to the post 510. An O-ring or other seal 539 is provided between the back enclosure 530 and an internal lip or ridge within the opening 526 of the post 510 to provide a hermetic seal between the components. Such a construction also provides effective ESD protection through the seams (a seam here being referred to as contacting surface connection between adjacent parts). All the other seams are also where metal and plastic meet/contact, thus ESD charge will go to metal and not to the PCB 560 housed within the interior cavity. And as previously described, the plastic-to-plastic part seams are molded-in, so there are no air gaps therebetween, and the only point of ESD ingression available is the seam between the metal pole and the plastic enclosure parts. Since the electrically conductive pole is directly tied to the base scanner housing which is tied to earth ground, the electrostatic discharge has a path to earth ground without entering the circuit.

The PCB section 560 is secured to the front enclosure by four screws (or bolts) 641, 642, 643, 644 which pass through corresponding holes 561, 562, 563, 564 disposed at the four corners of the PCB, then through corresponding holes 622a, 622b, 622c, 622d at the corners of the body 621 in the LED lens assembly 620, and then into corresponding screw bosses 611, 612, 613, 614 (or other suitable connector) within the top section 606 of the front enclosure 600. It is noted that in FIG. 10 the LED lens assembly 610 is illustrated in a fully exploded, separated position from the PCB section 560, and then in FIG. 11 the LED lens assembly 620 is positioned aligned and contacting the PCB section 560.

The upper lens mount 580 includes a tab 586 which engages a mating indentation or protrusion 529 within the top upper section 524 of the post 510. To assemble, the tab 586 is inserted into the indentation 529 and the bottom section 602 of the front enclosure is then rotated/pivoted into the internal cavity 525 of the post 510 aligning the screw boss 607 at the bottom section 602 with the screw hole 512 in the bottom portion 520 of the post 510. Once aligned, a screw or bolt 514 is passed through the hole 512 and screwed into the screw boss 607 thereby securing the components in place. Additional tabs and detents may be provided along the lengths of the post 510 and front enclosure 610 to provide a snap fit connection for further secure attachment of the components.

Figure 23:
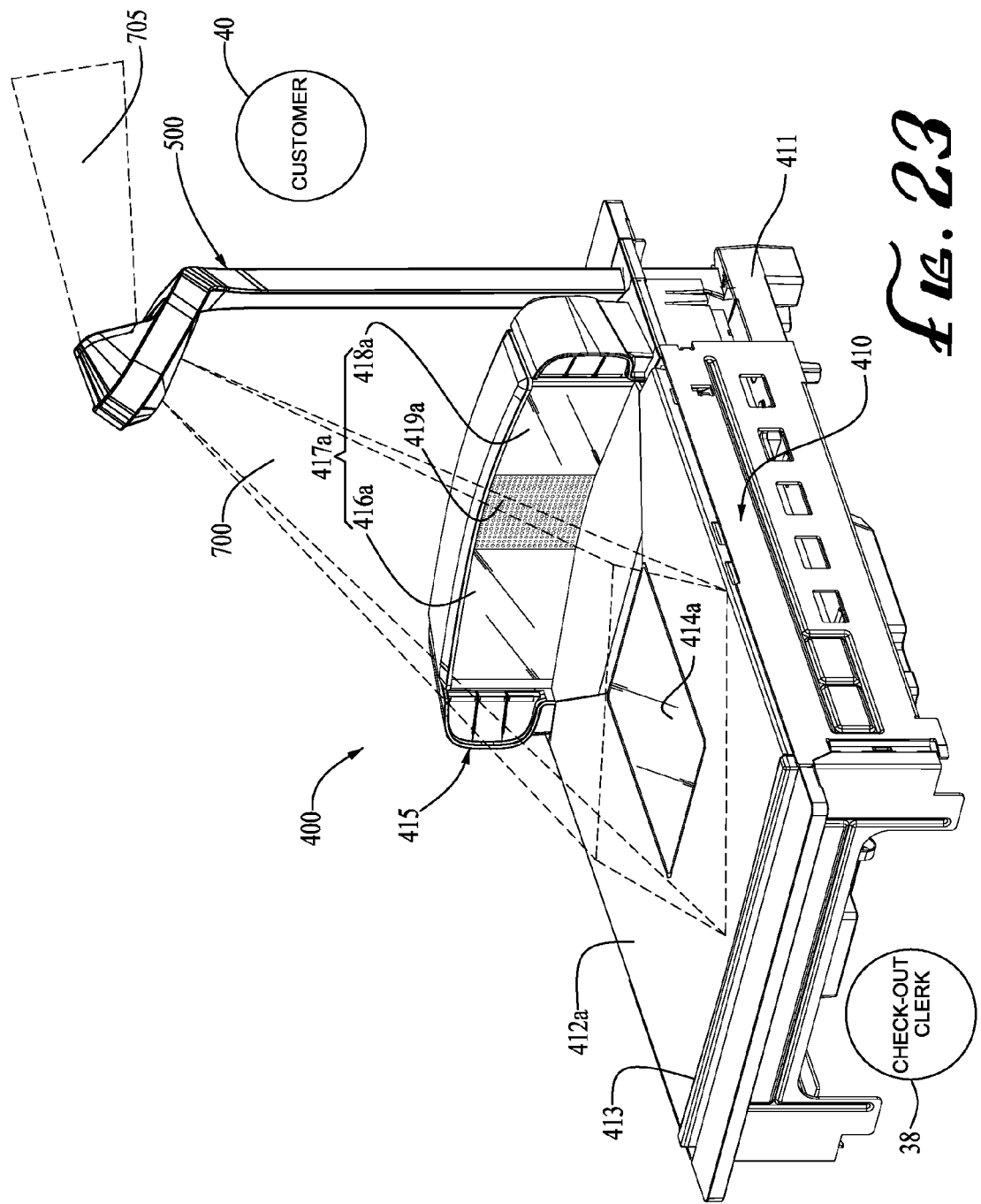
FIG. 23 is a front isometric view of the data reader of FIG. 7, illustrating example fields of view.

FIG. 23 illustrates example multiple fields of view of the TDR 500 according to one embodiment. As previously described, the top down data reader 500 houses a pair of imagers 566, 570. In one embodiment, the top imager 570 may project a field of view 705 through the back window 534 and directed toward the customer 38 for reading coupons, affinity cards or certain identification information from the customer's cell phone. In addition, the bottom imager 570 may project a field of view 700 that spans at least an area that overlaps with the area of the window 414a to help ensure that optical codes on the top surface 26 of objects 20 passing through that region are read by the TDR bottom imager 570. Moreover, depending upon the position if the item 20 in the read zone and the related angles of view, the TDR bottom imager 570 may also provide some view of the trailing side 32 and the customer side 36 (for a TDR and item orientation as in FIGS. 7 and 23). In addition, it should be understood that the fields of view 700, 705 designated in FIG. 23 are for illustration purposes only and not meant as limiting. The fields of view 700, 705 may be designed/selected depending on a number of factors, such as position of the top down data reader 500, depth of field/focus of the lens system(s), other characteristics of the imagers 566, 570, or the design of the checkout counter.

In an example operation where a cell phone display is used to present a coupon, the customer 40 may search on a mobile device (such as on email or through the Internet) to determine if one or more objects 20 qualifies for a coupon or discount. Once the customer 40 finds a valid coupon, the coupon may be accessed or downloaded onto the mobile phone device and made ready for presentation. Thereafter, the customer 40 may present the coupon to the TDR 500 by presenting the phone display or screen to the field of view 705. The TDR 500 may then read the phone display and capture the barcode or other encoded data on the coupon and may emit a sound or other signal notifying the customer 40 that the information was successfully captured. The top imager 566 may acquire an image (i.e., a photo) of either an item presented or even the customer (who may be in the field of view 705) for presentation or storage for some suitable purpose. Similarly, the bottom imager 570 may acquire an image of the read area 700, for example in a self-checkout system, an item that the customer is unable to identify, the image from the bottom imager 570 may be processed via image recognition to allow identification, or the image may be displayed on a remote display to a checkout clerk, who can then identify the item visually and handle the item exception.

In some embodiments, to help the customer properly position the mobile device in the field of view 705 for the top imager 566, a laser or other pattern (such as a red laser line or other similar pattern commonly used by a typical portable data reader) may be visible and reflected off the mobile phone screen or device. The customer 38 can use that pattern to ensure proper placement of the mobile phone so that the information is captured by the top imager 566. In some instances, such as when the phone is extended outward and in front of the customer's 38 body for presentation to the top imager 566, the phone body may block the customer's 38 view of the guiding laser/pattern. In such instances, the customer 38 may simply move to one side, such that the phone is held out to the left or the right of the customer such that the guiding laser/pattern is easily visible on the phone screen.

Depending on the layout of the data reader 400 and/or the checkout stand arrangement, ambient lighting may be sufficient to provide adequate illumination for the top imager 566. In some embodiments, additional light sources may be added. For example, light sources may comprise any suitable light source such as a row or array of LEDs arranged in a similar fashion as previously described with respect to FIG. 13. Any suitable number of LED arrays may be employed. In some embodiments, the one or more of the light sources may be operated in a pulsed mode, the pulsing synchronized with the imager frame rate or a multiple thereof. Additional examples and details for illumination and light source pulsing are described in U.S. Pat. No. 7,234,641, the disclosure of which is hereby incorporated by reference.

In some embodiments, the data reader 400 does not include additional illumination for the top imager 566 of the TDR 500. Typical mobile phone screens or displays may be best read without additional illumination, due to backlighting and reflectivity of the screen. Accordingly, using additional lighting may make it difficult for the top imager 566 to accurately read the information from the display because the image may be flooded with light and washed out. In such embodiments, the top imager 566 may use a relatively long exposure time and possibly a slower frame rate to accurately capture the electronic data. For improved performance, the top imager 566 may have a high-resolution, wide field of view 705 so as to be able to adequately read the mobile phone device without requiring precise aim from the customer 40. Alternately, top imager 566 may instead be a smaller resolution imager having a smaller field of view 705 that would likely need the customer 40 to present the mobile device with some precision. It should be understood that a variety of components and imagers with different performance specifications may be used as desired without departing from the principles of the disclosure.

In some embodiments, information gathering by the imagers 566, 570 may be performed concurrently. For instance, the clerk 38 may scan the objects 20 using the bottom imager 570 at the same time (as well as the imagers 204, 210 in the lower housing) that the customer 40 presents the cell phone to the top imager 566. In some instances, however, running the two imagers 566, 570 concurrently may result in diminished performance of one or both imagers 566, 570. To help ensure that the general checkout process using the bottom imager 570 is not interrupted or otherwise interfered with, any information gathered by the top imager 566 may be temporarily stored in a buffer or other memory unit while the clerk 38 finishes scanning all the objects 20. Thereafter, the clerk 38 may retrieve the coupon information and apply it to the total price of the purchased objects 20. In other embodiments, the clerk 38 may instead instruct the customer 40 to withhold presenting the mobile phone until after the clerk 38 has processed all of the objects 20. In such embodiments, the clerk 38 may opt to inactivate the top imager 566 until after the scanning process has been completed.

In other embodiments, the top imager 566 may be configured to capture both the electronic data from the mobile device (e.g., the cell phone display) and also capture and process data from printed materials, such as coupons, bank credit cards, debit cards, affinity cards, store credit card or from displays of cell phones or mobile devices that do not have a backlit screen. In some embodiments, ambient illumination may provide sufficient lighting for the top imager 566 to read data off printed materials (thereby not requiring additional illumination), while also not saturating backlit screens so as to affect data capture from a mobile device.

When ambient lighting is not reliable or available, additional illumination may be useful for reading data from printed materials or from mobile devices without backlit screens. Preferably, any additional illumination for the top imager 566 is kept to a minimum so as to not affect performance of the top imager 566 when reading devices with backlit screens. In other instances, additional illumination may be provided by an illumination system that can be turned off and on (either automatically or manually) so that the additional illumination does not wash out the displays on backlit screens. For instance, in one embodiment, the data reader 400 may include a button or other power switch to turn on the illumination modules as needed to read printed materials and turn off the modules when reading a backlit screen.

In still other embodiments, the illumination may be configured to cycle between on and off positions until it can successfully read the item presented to the top imager 566. Example methods for such embodiments are disclosed in U.S. Pub. Nos. 2012/0067956 and 2012/0000982, the disclosures of which are hereby incorporated by reference.

Although the embodiments in FIGS. 7-13 illustrate the imagers 566, 570 housed in a single post 510, other embodiments may include a data reader 400 with two separate posts, where each of the posts houses one of the imagers 566, 570. In such embodiments, the internal components and optics may be arranged in a similar fashion as previously described and the functionality of the respective imagers 566, 570 may be the same. For instance, the top imager 566 would be configured to capture information provided by the customer 38 and the bottom imager 570 would be configured to capture information from a top surface 26 of the object 20. In other embodiments, the TDR head portion, for example may be mounted without a post section, such as via mounting to the upper housing 415 of the data reader, or alternately mounted to a component of the checkstand such as a check-writing shelf.

Figure 24:
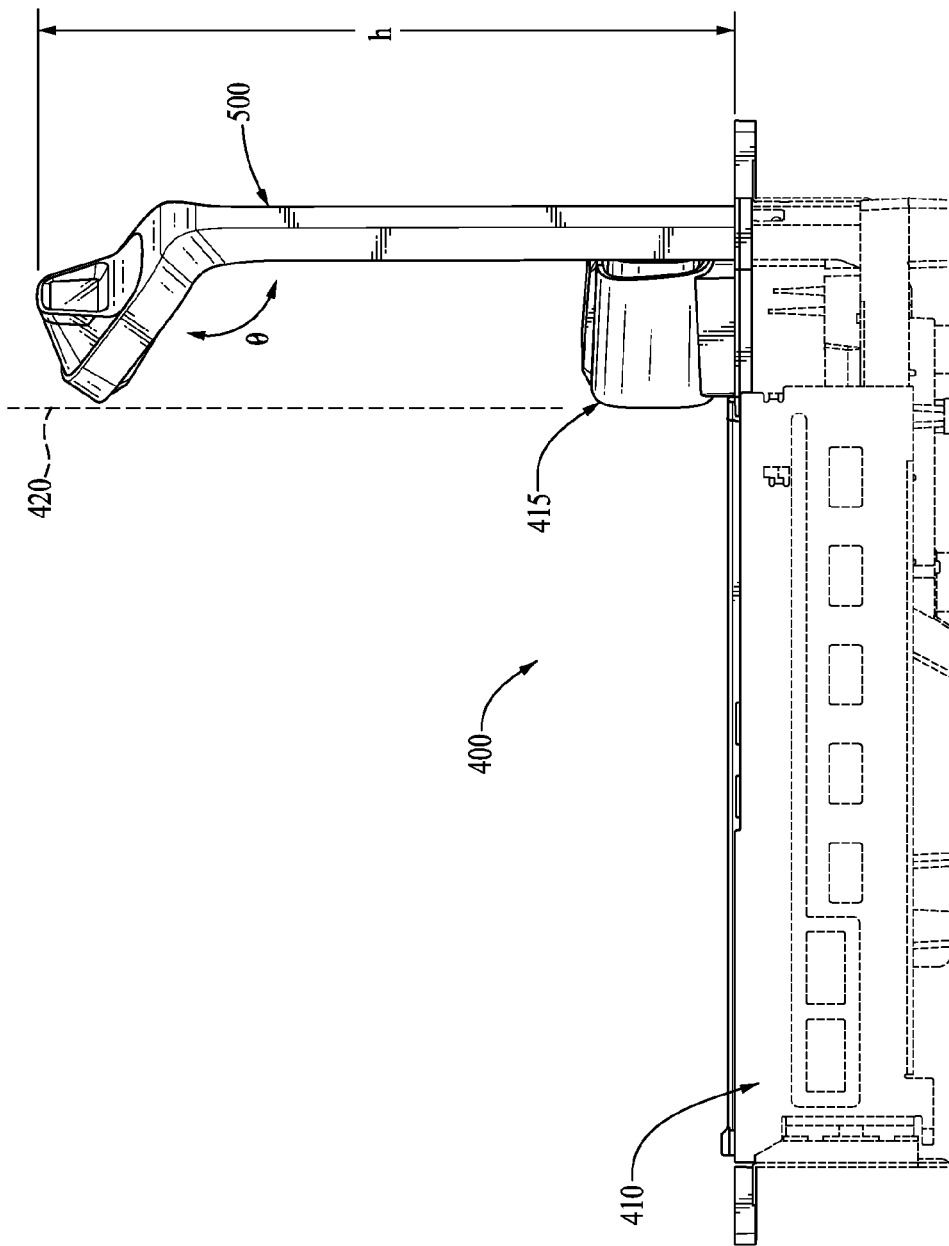
FIG. 24 is a side elevation view of the data reader of FIG. 23 showing height dimensioning.

Referring to FIG. 24, the TDR 500 is illustrated as extending to a height position h (as measured from the counter surface or platter surface) at least equal to or above the vertically-protruding section 415 to effectively capture a top down view of the top surface 26 of the object 20. Generally speaking, the TDR 500 may be positioned at a height approximately two to three times higher than the height of the vertically-protruding section 415. For instance, in one configuration, the vertically-protruding section may have a height ranging from between 2 and 5 inches (5 cm to 12.7 cm), and the height h of the TDR 500 may have a suitable height h of 7 inches (17.8 cm), or 10 inches (25.5 cm) or some other suitable height with clearance over the vertically-protruding section 415.

Figure 25:
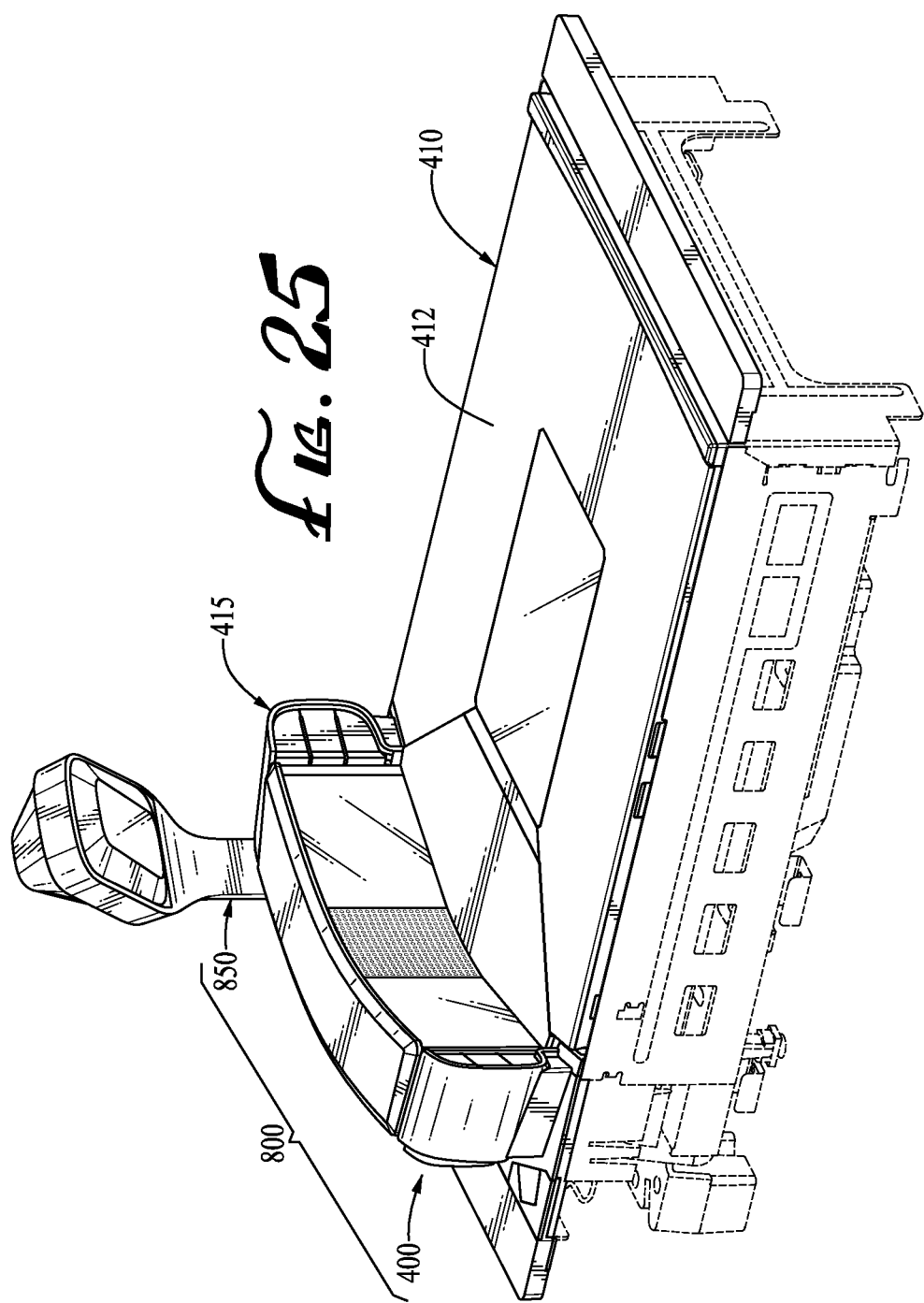
FIG. 25 is a top isometric view of an alternative data reader to the top down reader of FIGS. 23-24.
Figure 26:
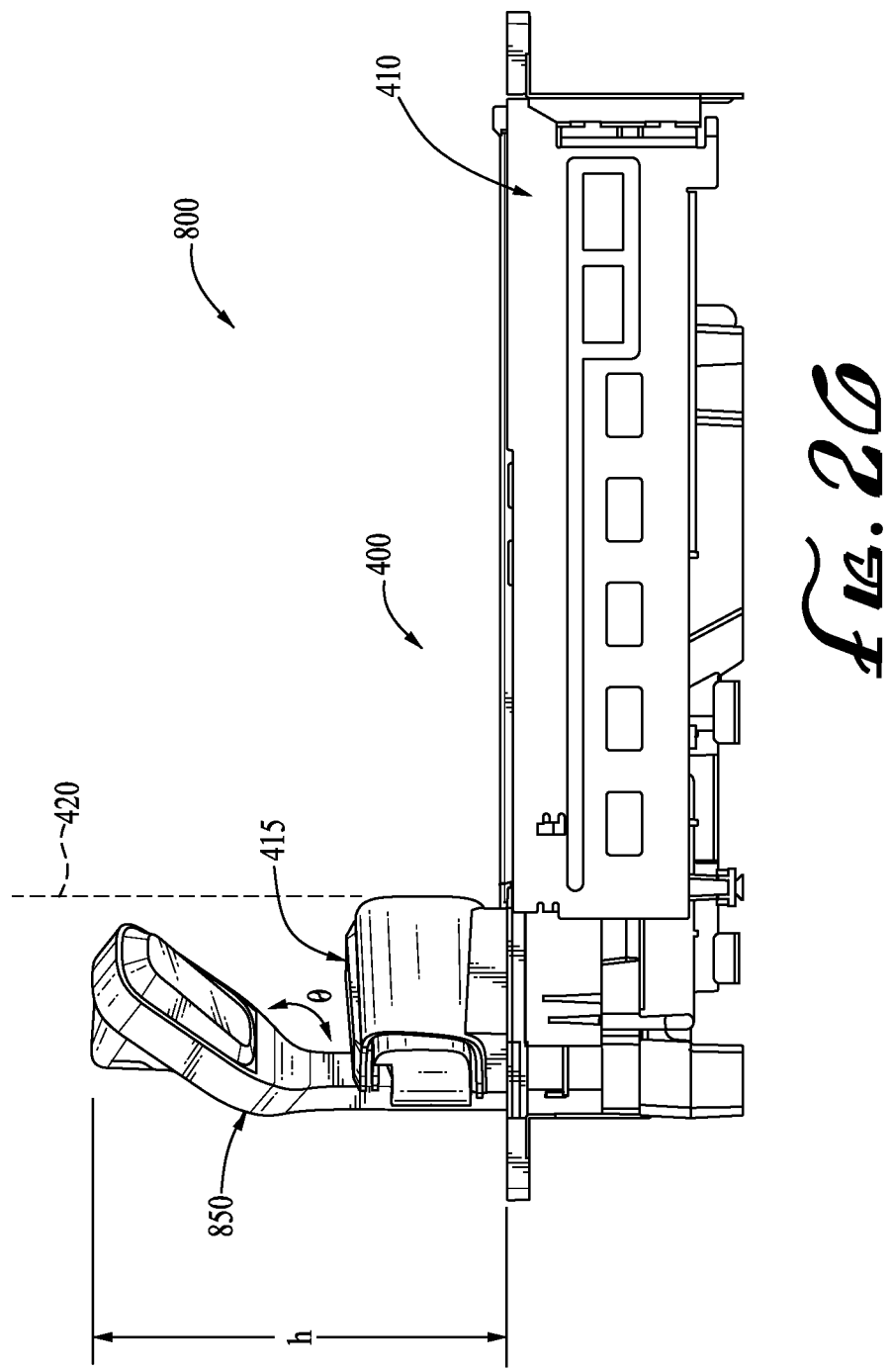
FIG. 26 is a side elevation view of the data reader of FIG. 25 showing height dimensioning.
Figure 28:
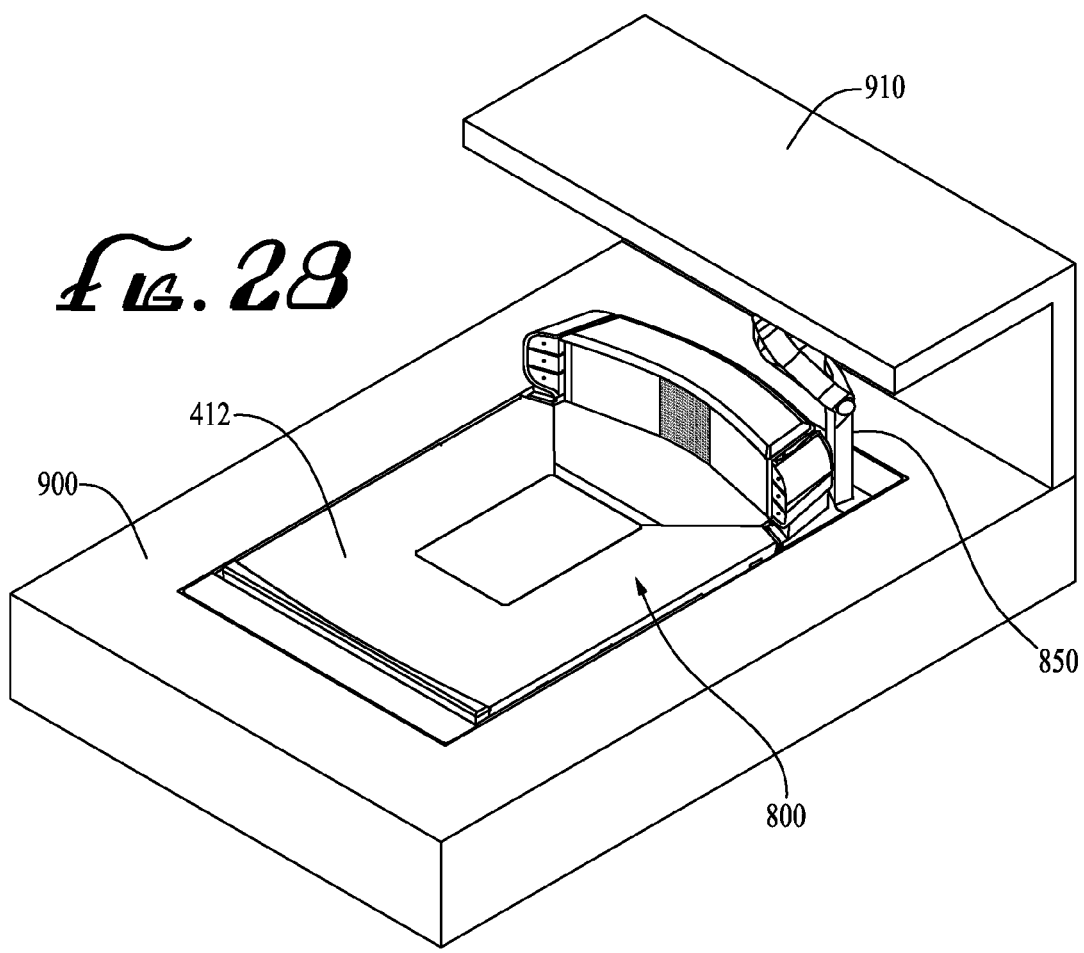
FIG. 28 is an isometric view of a data reader and an alternate top down reader, with the data reader installed in a checkout counter or checkout stand, the counter including a check-writing shelf.
Figure 29:
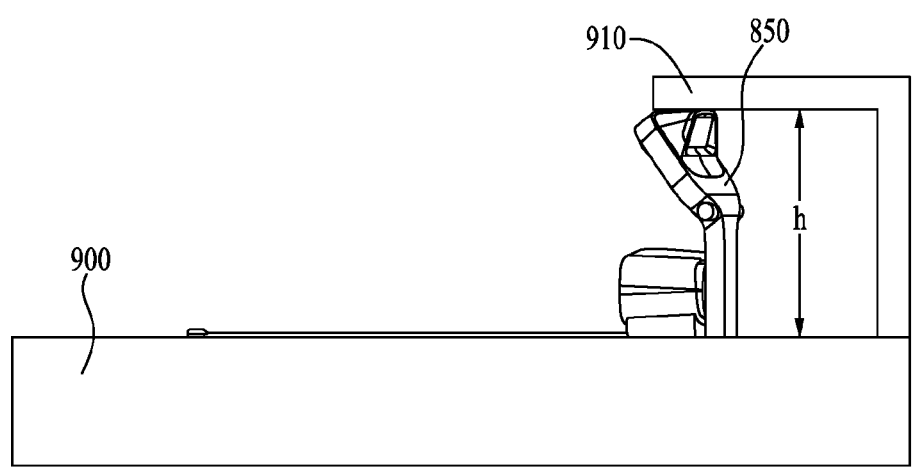
FIG. 29 is a side elevation view of the data reader and checkout counter of FIG. 28.

FIGS. 25-26 illustrate an alternate data reader 800 with an alternate height TDR 850 disposed at a lower height h. Though the TDR 850 may not have a field of view capable of viewing top side of items as tall as that capable of the TDR 500 of FIGS. 23-24, the TDR 850 may nonetheless provide improved top down reading capabilities to the reader 400. The lower height TDR 850 may also be better suited to fit within certain checkstand configurations such as beneath a check-writing shelf, POS display or POS keyboard. FIGS. 28-29 further illustrate the data reader 800 installed within a cutout section of a checkout counter 900, the checkout counter including an example configuration for a check-writing shelf 910. FIGS. 28-29 illustrate an example embodiment of the lower height TDR 850 conveniently positioned below the check-writing shelf 910 of the checkout counter 900 with a height h on the order of 7 inches (17.8 cm).

Other heights h for the TDR may be implemented. For a higher vertically-protruding section of 415 (e.g., a height of 7 inches, 17.75 cm), the TDR height h may be on the order of 8-10 inches (20.3 cm-25.5 cm) or higher, for example on the order of 13 inches (33 cm). Alternately, the vertical section 415 may have a height ranging from 0.5 inches (1.25 cm) to 5 inches (12.7 cm). In a lower height vertical section, the TDR 500, 850 may provide more significant reading capabilities not only for the top side of items but potentially for customer side of items. In the embodiment where the TDR is to be configured beneath a check-writing shelf 910 as in FIGS. 28-29, the overall height h of the TDR 850 is about 7 inches (17.75 cm).

It is also noted that the angle θ of the TDR head section to the vertical post portion (see angle θ as shown in FIGS. 24 and 26) is selected to provide the desired angle/direction of view of the imager into the read volume. The angle θ for the shorter TDR 850 (on the order of 125°) is greater than the angle θ (on the order of) 145° for the taller TDR 500.

Figures 30, 31:
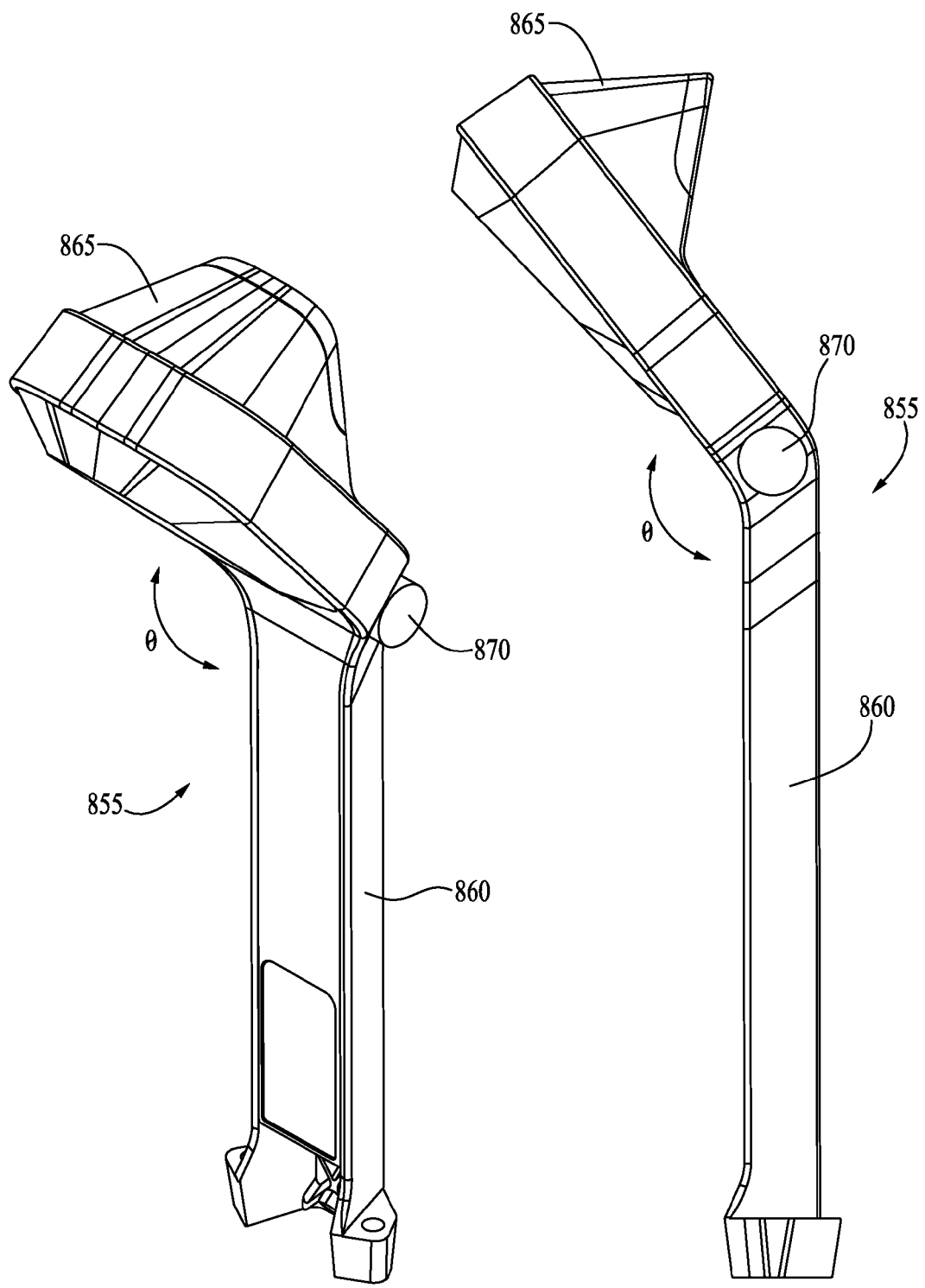
FIG. 30 is an isometric view of the housing for the top down reader of FIGS. 28-29.
FIG. 31 is a left side elevation view of the top down reader of FIG. 30.

The TDR may be provided with both height and head angle adjustment mechanisms thus enabling a single construction to be adaptable for variable heights and view angle. FIGS. 30-31 illustrate a TDR 855 including a post section 860 (which may comprise a telescoping construction) and a head section 865 interconnected by a pivot connection/mechanism 870. The pivot connection/mechanism 870 allows for the adjustment of the angle θ thus providing the desired aiming of the imager into the read region. The pivot connection/mechanism 870 may include stops, a locking device, and/or other mechanism(s), such as a ratchet, to retain the head section 865 at the desired angle θ once moved/pivoted into the desired angle/position.

Figure 27:
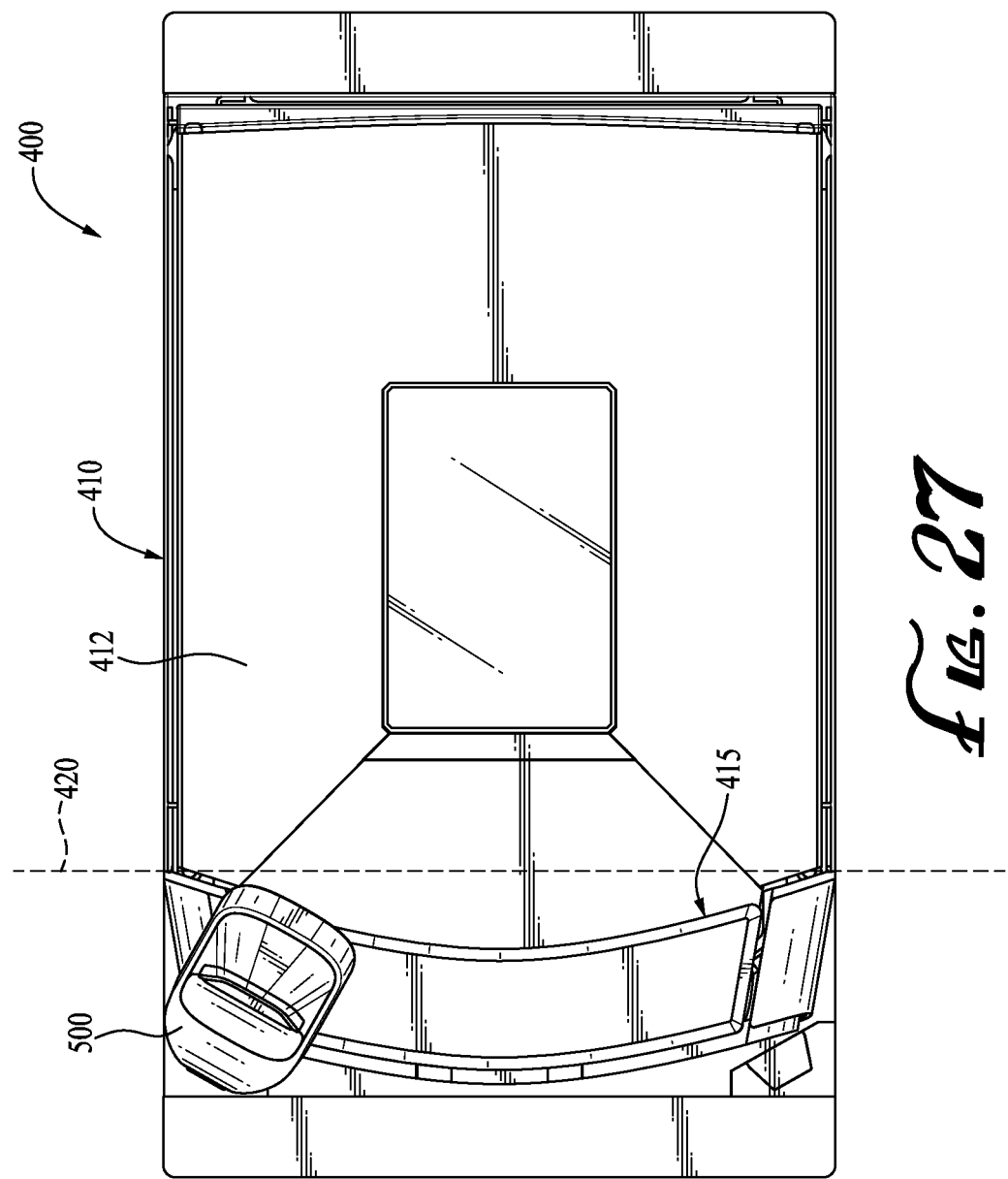
FIG. 27 is a top plan view of the data reader of FIGS. 25-26.

It may be preferred that the TDR be placed outside the product path of items being passed through the read zone of the data reader. For example, FIGS. 24, 26 and 27 also illustrate how the TDR 500 or the TDR 850 is positioned outside the product path. The boundary of the product path is illustrated by dashed lines 420 in FIGS. 24 and 27 showing that the head section of the TDR 500 does not extend into the product path beyond the extent of the top section 415 of the data reader. Similarly the boundary of the product path is illustrated by the dashed line 420 in FIG. 26 showing that the head section of the TDR 850 does not extend into the product path beyond the extent of the top section 415 of the data reader.

The top plan view of the data reader 400 of FIG. 27 also illustrates the TDR 500 being not only disposed outside of the product path for items, but is also disposed within an outer footprint of the lower housing section 410 (represented by the outer extent/perimeter of the data reader 400).

In an example installation, the data reader 400/500 is located at a point of sale (POS) station and is operative to effectively read an optical code on various sides of the item 20 as the item is passed through a scan region, the data reader having a main housing with a lower housing section 410 with an upwardly-facing horizontal window 414a and an upper housing section 415 disposed on a side of the lower section with a sidewardly-facing vertical window. In one example method of operation, a method of reading comprises the steps of:

passing a six-sided rectangular box-shaped object 20 within or through the scan region with a first lateral side 36 of the box-shaped object facing the vertical window 417a, a bottom side 28 facing the horizontal window 414a, a top side 26 facing away from the horizontal window 414a, a second lateral side 34 facing away from the vertical window, a leading lateral side 30, and a trailing lateral side 32;

reading out through the horizontal window 414a to read the bottom side 28 of the item;

reading out through the vertical window 417a to read the first lateral side 36 of the item;

reading out from a TDR 500 disposed on a post extending above (meaning at a greater height) and optionally over the upper housing section 415 and having (a) a first field of view 700 downwardly (and/or forwardly) into the scan region, operative to read the top side 26 of the item 20 and (b) a second (optional) field of view backwardly and away from the scan region. As shown in FIG. 24, the post of the TDR 500 extends vertically upward and thus extends above the upper housing section 415, wherein the TDR head section extends forwardly over the over the upper housing section 415. Optionally, the view off the mirror 598 may be either somewhat downwardly (which may better utilize ambient light on the item being read), or upwardly (which may allow for easier presentation of a cell phone display thereto).

Another example method for reading an optical code on an item being passed through a scan region comprises the steps of positioning a first imager within a vertically-protruding structure, the vertically-protruding structure extending to a first height above a generally horizontal scan surface of a data reading system;

positioning a second imager within a housing of an upwardly extending structure, the upwardly extending structure extending to a second height above the first height of the vertically-protruding structure, such that the second imager is positioned above the first imager;

directing a first field of view of the first imager from a position of the first imager through a first window into the view volume from a first perspective;

directing a second field of view of the second imager from a position of the second imager through a second window into the view volume from a second perspective, where the second perspective is configured to allow the second imager to capture the optical code when present on a top surface of the item;

forming one or more first images at the first imager of the first field of view into the view volume;

forming one or more second images at the second imager of the second field of view into the view volume;

processing the optical code based on the one or more of the first and second images.

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the invention(s).

The invention claimed is:

1. A data reading system for reading an optical code on an item, the data reading system comprising:

a main housing including a lower housing section containing a horizontal window and an upper housing section containing a vertical window;

a post having a lower post end mounted proximate the main housing, the post being vertically oriented and positioned behind the upper housing section and having an upper post end extending above the upper housing section;

a top down reader (TDR) disposed on the upper post end and having (a) a downwardly facing first field of view from above the upper housing section onto a top side of an item being moved across the horizontal window of the lower housing section and (b) a second field of view facing outwardly therefrom and away from the horizontal window for reading an item presented proximate thereto.

2. A data reading system according to claim 1 wherein the post comprises a one-piece metal frame section extending from the lower post end to the upper post end, the frame section including (a) an elongated vertical post section having an internal cavity along its vertical extent, and (b) an expanded upper section disposed at an angle to the vertical post section, the expanded upper section including a central cavity.

3. A data reading system according to claim 2 wherein the TDR includes TDR electronics and optics disposed within the central cavity of the expanded upper section of the frame section.

4. A data reading system according to claim 3 wherein the TDR electronics include a printed circuit board (PCB) mounted within the central cavity, the data reader further comprising cabling connected to the PCB and being routed through the internal cavity of the vertical post section from the upper post end down to the lower post end.

5. A data reading system according to claim 1 wherein the data reader main housing includes a metal chassis, and wherein the lower post end is directly connected to the metal chassis of the main housing.

6. A data reading system according to claim 1 wherein the TDR comprises an outer enclosure containing an internal cavity, a printed circuit board (PCB) disposed in the cavity, a first imager on a bottom side of the PCB providing the downwardly facing field of view, and a second imager on a top side of the PCB for providing an upwardly or sidewardly facing field of view.

7. A data reading system according to claim 6 further comprising
a one-piece top assembly frame disposed over the second imager and having a top lens mount and a top mirror mount;
a top lens assembly mounted onto the top lens connection mount of the top assembly frame; and
a fold mirror mounted onto the top mirror mount of the top assembly frame for directing a field of view of the second imager outwardly from the TDR.

8. A data reading system according to claim 1 further comprising
a first imager with the downwardly facing field of view; and
an illumination source disposed in the TDR for illuminating the downwardly facing field of view of the first imager.

9. A data reading system according to claim 8 wherein the illumination source is selected from the group consisting of: multi-color LEDs, single wavelength LEDs, multiple LEDs of the same wavelength, multiple LEDs of various wavelengths.

10. A data reading system according to claim 1 wherein the TDR comprises at least one imager disposed in the outer enclosure for providing the downwardly facing field of view from above the upper housing section.

11. A data reading system according to claim 1 wherein the main housing comprises an imaging reader with one or more imagers for providing multiple fields of view out of the horizontal window and the vertical window of the lower housing section.

12. A method for reading an optical code on an item using a data reader located at a point of sale (POS) station to effectively read the optical code as the item is passed through a scan region, the data reader having a housing with a lower housing section with an upwardly-facing horizontal window and an upper housing section disposed on a side of the lower section with a sidewardly-facing vertical window, comprising the steps of:
passing a six-sided rectangular box-shaped object within or through the scan region with a first lateral side of the box-shaped object facing the vertical window, a bottom side facing the horizontal window, a top side facing away from the horizontal window, a second lateral side facing away from the vertical window, a leading lateral side, and a trailing lateral side;
reading out through the horizontal window to read the bottom side of the item;
reading out through the vertical window to read the first lateral side of the item;
reading out from a top down reader (TDR) in a first field of view over the upper housing section and downwardly and into the scan region to read the top side of the item, the TDR disposed on a post positioned behind the upper housing section and extending above the upper housing section;
reading out from the TDR in a second field of view outwardly therefrom and away from the scan region for reading an item presented proximate thereto.

13. A method of data reading according to claim 12, wherein the second field of view is directed away from the scan region for reading an electronic device display presented proximate thereto.

14. A data reading system for point of sale (POS) for reading various sides of an item being presented in a scan region, comprising
a main housing structure constructed and arranged for installation in a checkout counter or checkout stand, the main housing structure defining a primary scan region operative for reading multiple sides of a six sided box-shaped item being passed through the primary scan region;
a vertical support connected to the main housing structure and extending vertically upward therefrom;
an upper reader module comprising a module housing attached to an upper end of the vertical support and having (a) a first aperture disposed at a top side of the module housing with a first field of view directed out from module housing away from the primary scan region for reading an object presented thereto, and (b) a second aperture disposed at a bottom side of the module housing with a second field of view directed downwardly into the primary scan region operative for reading a top side of the item.

15. A data reading system according to claim 14 wherein the upper reader module comprises a top down reader (TDR).

16. A data reading system according to claim 15 wherein the vertical support comprises a post, the TDR being mounted on a top end of the post and disposed above the main housing structure.

17. A data reading system according to claim 16 further comprising
a printed circuit board (PCB) disposed within a housing of the TDR;
a first imager disposed on a bottom side of the PCB for providing the first field of view, and
a second imager disposed on a top side of the PCB for providing the second field of view.

18. A data reading system according to claim 14
wherein the upper reader module comprises a top down reader (TDR) having a second field of view directed downwardly into the primary scan region operative for reading a top side of the item,
wherein the main housing structure includes a lower housing section containing a horizontal window and an upper housing section containing a vertical window,
wherein the TDR includes (a) a post having a lower post end coupled to the lower housing structure, the post being vertically oriented and having an upper post end extending above the upper housing section, the upper post end supporting an expanded upper end section disposed at an angle to the vertical post section, the expanded upper end section including a central cavity; (b) a first imager housed in the central cavity for providing the first field of view via projecting through a first window on the expanded upper end section and directed toward the scan region, the first field of view overlapping with at least a portion of the horizontal window on the lower housing section; and (c) a second imager housed in the central cavity and for providing the second field of view via projecting through a second window on the expanded upper end section, the second field of view projecting through the second window and directed away from the lower housing structure.

19. The data reading system of claim 18, wherein the lower housing section supports a weigh platter configured for weighing an item when placed on the weigh platter, and wherein the post is coupled to the lower housing structure in a position where the post is not weighed by the weigh platter.

20. The data reading system of claim 18, wherein the second imager is configured to read information from an electronic device display presented thereto by a customer.

21. A data reading system comprising
- a main housing structure constructed and arranged for installation in a checkout counter or checkout stand, the main housing structure including a lower housing section containing a horizontal window and an upper housing section containing a vertical window, the main housing structure defining a primary scan region operative for reading multiple sides of a six sided box-shaped item being passed through the primary scan region;
- a vertical support connected to the main housing structure and extending vertically upward therefrom;
- a top down reader (TDR) disposed on a top end of the vertical support, the TDR having a first field of view downwardly facing from above the primary scan region onto a top side of an item being moved through the primary scan region,
- wherein the vertical support is disposed outside the upper housing section and wherein the vertical support and the TDR are disposed within an outer footprint of the main housing structure,
- wherein the TDR comprises (a) a first imager for providing the first field of view via projecting through a first window downwardly toward the scan region, and (b) a second imager for providing a second field of view via projecting through a second window upwardly or sidewardly away from the main housing structure.

22. A data reading system according to claim 21 wherein the vertical support comprises a post having a lower post end coupled to the lower housing structure, the post being vertically oriented and having an upper post end extending above the upper housing section.

23. A data reading system according to claim 21 wherein the upper housing section comprises a curved structure and wherein the vertical support is disposed at a corner of the lower housing section adjacent a rear side of the upper housing section.

* * * * *

UNITED STATES PATENT AND TRADEMARK OFFICE
CERTIFICATE OF CORRECTION

| | |
|---|---|
| PATENT NO. | : 9,004,359 B2 |
| APPLICATION NO. | : 13/895258 |
| DATED | : April 14, 2015 |
| INVENTOR(S) | : Shearin et al. |

Page 1 of 1

It is certified that error appears in the above-identified patent and that said Letters Patent is hereby corrected as shown below:

In the Specification

Column 5
Line 44, change "post 175" to --post 176--.

Column 6
Lines 2-3, change "platter 132" to --platter 130--.

Column 9
Line 52, after "proper" delete "the".

Column 11
Line 42, change "FIG." to --FIGS--. (First Occurrence)

Column 12
Line 19, before "screws" delete "a".

Column 14
Line 32-33, change "previously-described" to --below-described--.
Line 44, change "(c)" to --or (b)--.

Column 15
Line 24, change "610" to --620--.
Line 44, change "top imager 570" to --top imager 566--.

Column 19
Line 47, after "forwardly" delete "over the".

Signed and Sealed this
First Day of March, 2016

Michelle K. Lee
*Director of the United States Patent and Trademark Office*